(12) United States Patent
Yamamoto

(10) Patent No.: US 11,836,911 B2
(45) Date of Patent: Dec. 5, 2023

(54) IMAGE DATA MANAGEMENT METHOD, PRODUCTION APPARATUS, PRODUCTION SYSTEM, IMAGE DATA MANAGEMENT METHOD FOR PRODUCTION SYSTEM, AND NON-TRANSITORY COMPUTER-READABLE RECORDING MEDIUM

(71) Applicant: CANON KABUSHIKI KAISHA, Tokyo (JP)

(72) Inventor: Kenkichi Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 16/035,876

(22) Filed: Jul. 16, 2018

(65) Prior Publication Data
US 2019/0035067 A1    Jan. 31, 2019

(30) Foreign Application Priority Data

Jul. 26, 2017    (JP) .................................. 2017-144927
Jun. 4, 2018    (JP) .................................. 2018-107083

(51) Int. Cl.
*G06T 7/00*    (2017.01)
*H04N 5/76*    (2006.01)
*H04N 21/4335*    (2011.01)

(52) U.S. Cl.
CPC ............... *G06T 7/001* (2013.01); *H04N 5/76* (2013.01); *H04N 21/4335* (2013.01); *G06T 2207/20092* (2013.01); *G06T 2207/30164* (2013.01)

(58) Field of Classification Search
CPC . G06T 2207/20092; G06T 2207/30164; G06T 7/001; H04N 21/4335; H04N 5/76
See application file for complete search history.

(56) References Cited

U.S. PATENT DOCUMENTS

| 4,136,930 A | * | 1/1979 | Gomm | ............... | G01N 21/8851 |
| | | | | | 356/239.6 |
| 2002/0118285 A1 | * | 8/2002 | Misawa | ............... | H04N 1/2112 |
| | | | | | 348/208.16 |

(Continued)

FOREIGN PATENT DOCUMENTS

| JP | 2004-063708 | 2/2004 |
| JP | 2004-144615 | 5/2004 |

(Continued)

OTHER PUBLICATIONS

Office Action dated Jul. 19, 2022 in counterpart Japanese Application No. 2018-107083, together with English translation thereof.

*Primary Examiner* — Jessica M Prince
(74) *Attorney, Agent, or Firm* — Venable LLP

(57) ABSTRACT

An image data management method of managing image data includes an image capturing step of capturing an image of an object by an image capturing portion, a storage priority obtaining step of obtaining a storage priority of the image data, an imparting step of associating the image data obtained by the image capturing portion with the storage priority obtained for the image data and storing the image data and the storage priority in a storage device, and an updating step of, in a case where the object whose image is captured by the image capturing portion is in a specific state, updating, on a basis of detection of the specific state, a storage priority associated with image data including image data stored in the storage device before image data in which the object is determined as being in the specific state is stored.

25 Claims, 10 Drawing Sheets

(56) References Cited

U.S. PATENT DOCUMENTS

| | | | |
|---|---|---|---|
| 2002/0191833 A1* | 12/2002 | Kim | G01N 21/95607 382/218 |
| 2004/0201669 A1* | 10/2004 | Guha | G01N 21/89 348/126 |
| 2008/0212421 A1* | 9/2008 | Kitagawa | H04N 5/76 369/47.12 |
| 2008/0298670 A1* | 12/2008 | Nakagaki | G06T 7/0004 382/149 |
| 2013/0177232 A1* | 7/2013 | Hirano | G06T 7/001 382/141 |
| 2013/0182941 A1* | 7/2013 | Hikida | G06T 7/001 382/149 |
| 2015/0012137 A1* | 1/2015 | Mimura | B25J 13/006 700/264 |
| 2019/0011252 A1* | 1/2019 | Moeller | G01B 21/08 |

FOREIGN PATENT DOCUMENTS

| | | |
|---|---|---|
| JP | 2008-294361 | 12/2008 |
| JP | 2010-230452 | 10/2010 |
| JP | 2016-062972 | 4/2016 |

* cited by examiner

IMAGE DATA MANAGEMENT METHOD, PRODUCTION APPARATUS, PRODUCTION SYSTEM, IMAGE DATA MANAGEMENT METHOD FOR PRODUCTION SYSTEM, AND NON-TRANSITORY COMPUTER-READABLE RECORDING MEDIUM

BACKGROUND OF THE INVENTION

Field of the Invention

The present invention relates to an image data management method, a production apparatus, a production system, and an image data management method for a production system in which image data obtained by an image capturing portion and stored in a storage device is managed by a control apparatus.

Description of the Related Art

In a production line or the like in a factory, an image processing apparatus is used for, for example, performing product quality inspection, in which a good product and a defective product are determined, or measurement of dimensions, shape, position, or orientation of a product or a workpiece that is to be processed into a product. In addition, a similar image processing apparatus is also sometimes used for measuring an operation status, for example, a position, orientation, or an operation stroke of a production mechanism of a production apparatus.

In an image processing apparatus of this kind, there is a case where an image of an object that is an image capturing target is captured by an image capturing portion such as a digital camera, and obtained image data is output to and stored in a storage device such as a data storage in addition to storing the obtained image data in the image capturing portion. In the case where it is determined that the object has a problem, for example, that the product is defective, or where a measurement result obtained from image processing shows an abnormal value, an operation of visually checking or analyzing old image data that is stored to specify a cause of the deficiency of the product or abnormality of measurement is performed. In addition, preventing a potential trouble that may occur in the future beforehand by checking change in image data even in the case where product deficiency and measurement abnormality have not occurred is also generally performed.

Meanwhile, the number of pixels in one image captured by an industrial camera used for an image processing apparatus of this kind has drastically increased in recent years, and it is often the case that a high-resolution camera is used for inspecting and measuring a product having a fine structure in a wide view. In the case of using such a high-resolution camera in many production processes and producing many products over a long period of time, the total amount of image data is enormous. Therefore, using a compressed image format for a storage format of the image data can be considered. However, considering performing image analysis, inspection, and reproduction of measurement processing on the stored image data, it is not preferable to perform irreversible compression on the image.

Here, it is assumed that, for example, 20 image processing apparatuses each including an industrial camera capable of obtaining 8-bit gray image data having 1.2 million pixels per image by image capturing are provided for monitoring 20 steps for producing one product. When it is assumed that 1000 of that product is produced per day over 5 years, the total size of the image data is as large as 12 MB×20 steps×1000 products×365 days×5 years=about 418 TB, which requires a large and expensive data storage, in the case where the image data is not compressed. Instead of this, storing only image data of NG images in which the result of image processing or product quality inspection is determined as NG, that is, defective, and deleting image data in which the result of image processing is normal can be considered. According to this, there is a possibility that important image data can be stored for a long period by using a data storage of a small capacity.

Conventionally, for example, Japanese Patent Laid-Open No. 2004-144615 proposes an image processing apparatus provided with two operation settings including an operation setting of storing all image data obtained by a camera and an operation setting of only storing NG images in the image data. In such a configuration, for example, the operation setting of only storing the NG images is selected in the case of suppressing consumption of data storage. According to such a configuration, by increasing the importance of NG images, which are a part of images required in considering a measure against defective products, and deleting images of low importance, images can be stored for a long period even in an environment only provided with a small amount of data storage.

In the conventional technique described in Japanese Patent Laid-Open No. 2004-144615, the importance of an image is determined when image processing is performed, and an image of low importance is deleted. Therefore, in the conventional technique described in Japanese Patent Laid-Open No. 2004-144615, an image stored in a storage device, that is, data storage, is constant without changing after being stored. However, in an actual production factory or the like, the importance of the image sometimes changes after some time. For example, in the case where a shape abnormality of a product is detected and the cause of the abnormality is change in the product shape due to malfunction of a processing machine, sometimes it is necessary to refer to images of the past.

In this case, the importance of a past image that has been low at the time of image processing increases as a result of detecting abnormality afterwards. In addition, in the case where image processing cannot be performed and measurement abnormality occurs due to the image being too dark, assuming that the cause thereof is decrease in emission luminance due to malfunction of an illumination apparatus, it is important that change in luminance can be investigated by referring to images of the past. Similarly in this case, the importance of images of the same object obtained in the past that has been low at the time of image processing increases as a result of the occurrence of measurement abnormality.

However, in the case where the conventional technique described in Japanese Patent Laid-Open No. 2004-144615 is used, since the importance of images is determined at the time of image processing and does not change afterwards, there is a possibility that important image data for inspecting the cause of product deficiency or measurement abnormality is deleted.

SUMMARY OF THE INVENTION

According to one aspect of the present invention, an image data management method of managing image data obtained by image capturing by an image capturing portion and stored in a storage device, the image data management method includes an image capturing step of capturing an image of an object by the image capturing portion, a storage priority obtaining step of obtaining a storage priority of the image data, an imparting step of associating the image data obtained by the image capturing portion with the storage priority obtained for the image data and storing the image data and the storage priority in the storage device, and an updating step of, in a case where the object whose image is captured by the image capturing portion is in a specific state, updating, on a basis of detection of the specific state, a storage priority associated with image data including image data stored in the storage device before image data in which the object is determined as being in the specific state is stored.

Further features of the present invention will become apparent from the following description of exemplary embodiments with reference to the attached drawings.

DESCRIPTION OF THE EMBODIMENTS

Figure 1:
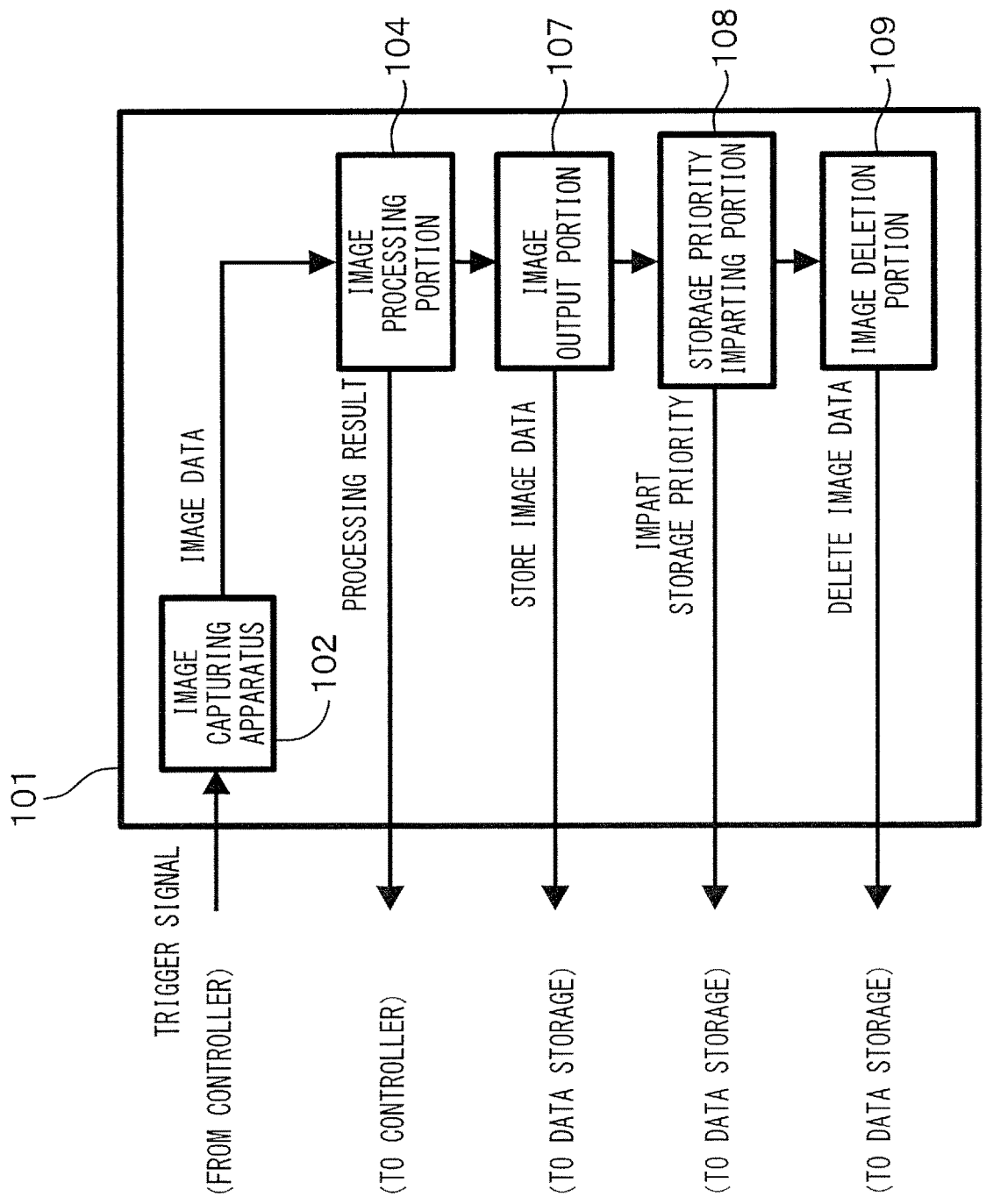
FIG. 1 is a block diagram illustrating a configuration of an image capturing apparatus according to exemplary embodiments of the present invention.

Exemplary embodiments of the present invention will be described below with reference to attached drawings. To be noted, the configurations shown below are merely examples, and details thereof can be appropriately modified by one skilled in the art within the gist of the present invention. In addition, numerical values shown in the exemplary embodiments below are merely reference values and should not limit the present invention.

Some exemplary embodiments related to an image data management method, a production apparatus, a production system, or an image data management method for a production system in which image data obtained by image capturing by an image capturing portion and stored in a storage device is managed by a control apparatus will be described. In this case, the storage device is, for example, a data storage of a large capacity such as a hard disk drive: HDD or a solid state drive: SSD, and is used for storing, for example, image data of images of an object captured by a plurality of image capturing apparatuses. In addition, the control apparatus used for the image data management of the present invention can be constituted by, for example, respective control apparatuses of the plurality of image capturing apparatuses. In addition, this control apparatus may be constituted by an upper layer controller, for example, a control apparatus such as a programmable logic controller: PLC disposed in a production line.

In the exemplary embodiments below, particularly in the image data management method, the control apparatus performs the following processing steps:

an image capturing step of capturing an image of an object by an image capturing portion;

a storage priority calculation step of calculating a storage priority of image data obtained in accordance with the state of the object whose image has been captured in the image capturing portion;

a storage step of associating the image data with the storage priority calculated for the image data and storing the image data and the storage priority in a storage device capable of storing image data obtained by a plurality of image capturing portions; and an updating step of, in the case where the object whose image is captured by the image capturing portion is in a specific state, updating the storage priority of the image data obtained by the image capturing portion and stored in the storage device.

The storage priority described above is information added to each piece of image data obtained by image capturing, and expresses whether the piece of image data is to be preferentially kept in the data storage, by characters or a sign from which whether the priority is high or low can be identified. For example, in the following exemplary embodiments, the storage priority is expressed by one of three options 0, 50, and 100. The storage priority of 0 represents the lowest priority, the storage priority of 100 represents the highest priority, and the storage priority of 50 represents an intermediate priority. This expression format of the storage priority of the present exemplary embodiment is merely an example, and other arbitrary formats different from this may be employed.

For example, in the following exemplary embodiments, the storage priority is used for determining the order of deletion of image data stored in the data storage serving as a storage device in the case where the amount of free space in the data storage is below a predetermined value. For example, pieces of image data are deleted in the order from pieces of image data having lower storage priorities to pieces of image data having higher storage priorities. In this case, image data having a storage priority of 0, which represents the lowest storage priority, is deleted first in the case where the amount of free space in the data storage is below the predetermined value. Image data having a storage priority of 50 is deleted in the case where the amount of free space in the data storage is still insufficient, for example, does not reach the predetermined value, after all image data having the storage priority of 0 is deleted. Image data having a storage priority of 100, which represents the highest storage priority, is deleted in the case where the amount of free space in the data storage is still insufficient, for example, does not reach the predetermined value, after all image data having a storage priority of 0 or 50 is deleted.

First Exemplary Embodiment

In the present exemplary embodiment, in a system including a plurality of image capturing portions, the storage priority of image data captured by a specific image capturing portion and stored in a data storage serving as a storage device is updated in the case where an object whose image is captured by the specific image capturing portion is in a specific state. For example, a workpiece or a production apparatus serves as the object. Whether the object is in the specific state is determined on the basis of, for example, a result of image processing performed on image data obtained by an image capturing portion. Examples of the specific state include a product being good or defective, and an operation being normal or abnormal. Particularly in the present exemplary embodiment, the object is an industrial product or a part that is being produced, an image of the object is captured by the image capturing portion for product quality inspection of the object, and image processing is performed on the image data thereof. Then, in accordance with a result of the image processing, whether the state of the object is within a normal range is inspected, and whether the object is a good product or a defective product is determined. Then, in the case where the object is determined as a defective product, the storage priority of image data captured by the specific image capturing portion in the past is updated to a higher value.

FIG. 1 illustrates a configuration of an image capturing apparatus according to a first exemplary embodiment of the present invention. As illustrated in FIG. 1, an image capturing apparatus 101 includes an image capturing portion 102, an image processing portion 104, an image output portion 107, a storage priority imparting portion 108, and an image deletion portion 109. The image capturing portion 102 is constituted by, for example, a digital camera including an image sensor. In FIG. 1, blocks denoted by reference signs of 104, 107, 108, and 109 can be constituted by software executed by a central processing unit: CPU 601 of a control apparatus illustrated in FIG. 10 that will be described later.

The image processing portion 104 of FIG. 1 is capable of performing some image processing on image data obtained by the image capturing portion 102 and transmitting a result thereof to a controller 110 that will be described below. This image processing is performed for, for example, obtaining information about the state of a production apparatus in a production system or the state of a workpiece handled by the production apparatus as illustrated in FIG. 9.

Figure 9:
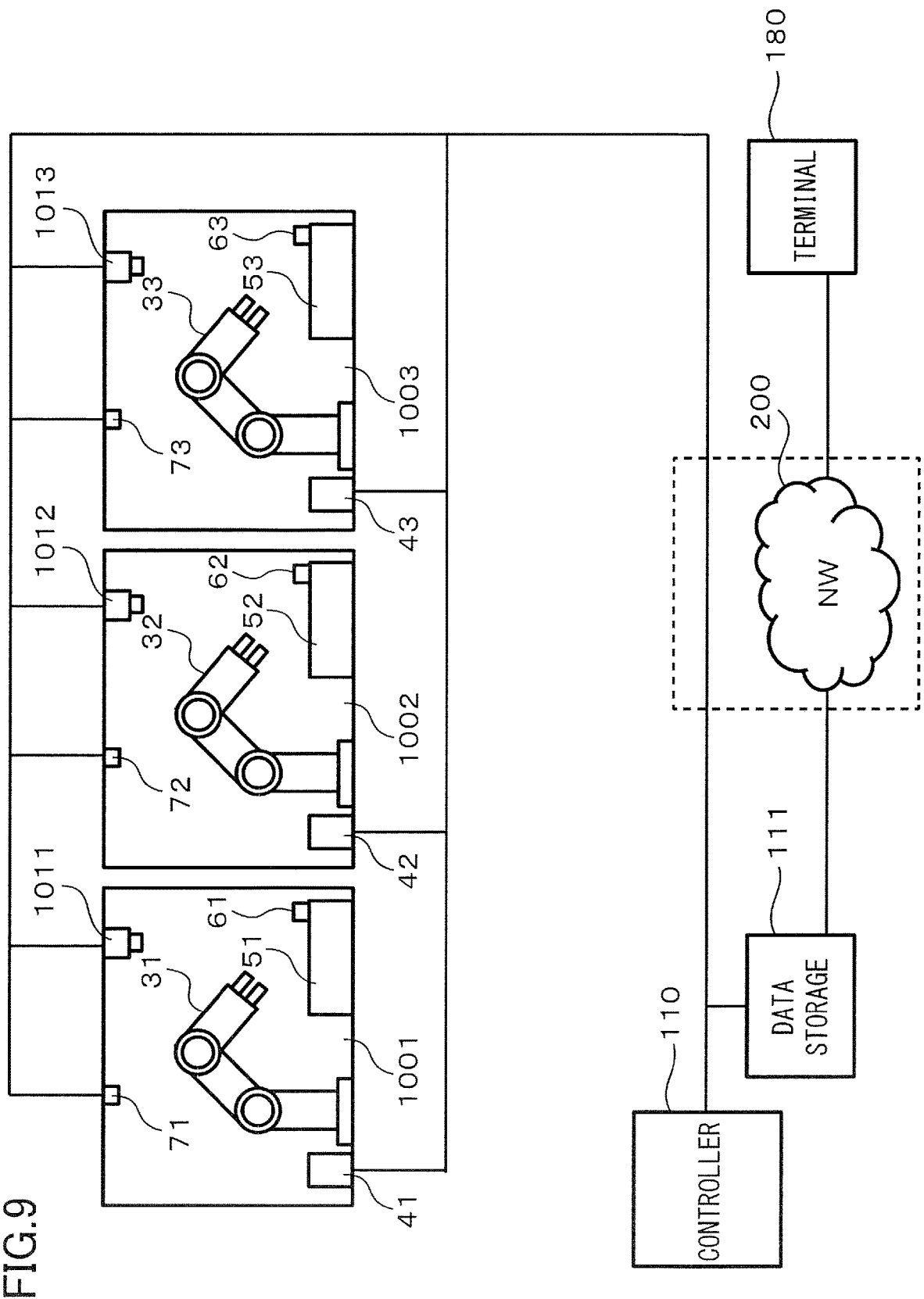
FIG. 9 is an explanatory diagram illustrating a configuration of a production system constituted by using an image capturing apparatus according to the exemplary embodiment of the present invention.

In the first exemplary embodiment, the image capturing apparatus 101 of FIG. 1 can be disposed as image capturing apparatuses 1011, 1012, 1013 . . . respectively in a plurality of production apparatuses 1001, 1002, 1003 . . . constituting a production line as illustrated in FIG. 9. The image capturing apparatuses 1011, 1012, 1013 . . . respectively capture, by image capturing portions 102 thereof, images of production mechanisms of the production apparatuses 1001, 1002, 1003 . . . and/or workpieces 61, 62, 63 . . . handled by the production mechanisms. In the example of FIG. 9, the production mechanisms of the production apparatuses 1001, 1002, 1003 . . . are respectively vertical multi-axis robot apparatuses 31, 32, 33 . . . serving as robot arms and are respectively controlled by robot control apparatuses 41, 42, 43 . . . . In addition, the production apparatuses 1001, 1002, 1003 . . . can be provided with sensors 71, 72, 73 . . . that respectively detect states of the production mechanisms thereof and/or the workpieces 61, 62, 63 . . . handled by the production mechanisms. The sensors 71, 72, 73 . . . are optical sensors, magnetic sensors, rotary encoders, linear encoders, or other arbitrary sensors, and are capable of detecting the states of the production mechanisms, that is, respective robot apparatuses, and/or the workpieces 61, 62, 63 . . . handled by the production mechanisms.

The robot apparatuses 31, 32, 33 . . . of the production apparatuses 1001, 1002, 1003 are controlled by an upper layer controller 110, which is constituted by an apparatus such as a PLC, via the respective robot control apparatuses 41, 42, 43 . . . . The controller 110 serving as a controller of the production line integrally controls, by controlling operations of the illustrated production apparatuses 1001, 1002, 1003 . . . , production steps performed on the workpieces 61, 62, 63 . . . . In addition, in the configuration of FIG. 9, a terminal 180 is connected to the controller 110 via a wired or wireless network 200 for changing settings of the controller 110.

In addition, image data of the production mechanisms and/or the workpieces 61, 62, 63 . . . handled by the production mechanisms obtained by image capturing by the image capturing portions 102 of the image capturing apparatuses 1011, 1012, 1013 . . . is stored in a data storage 111 of a large capacity including an HDD, an SSD, or the like. In FIG. 9, the network 200 is illustrated as interconnecting the terminal 180 and the controller 110. However, as indicated by a broken line, the network 200 may be used for connecting the controller 110 to the robot control apparatuses 41, 42, 43 . . . , the image capturing apparatuses 1011, 1012, 1013 . . . , and the sensors 71, 72, 73 . . . . In the exemplary embodiments below, some signals communicated between the controller 110 and the image capturing apparatuses 1011, 1012, 1013 . . . are each communicated by 1 bit of "High" or "Low" of low voltage transistor-transistor logic: LVTTL.

Figure 10:
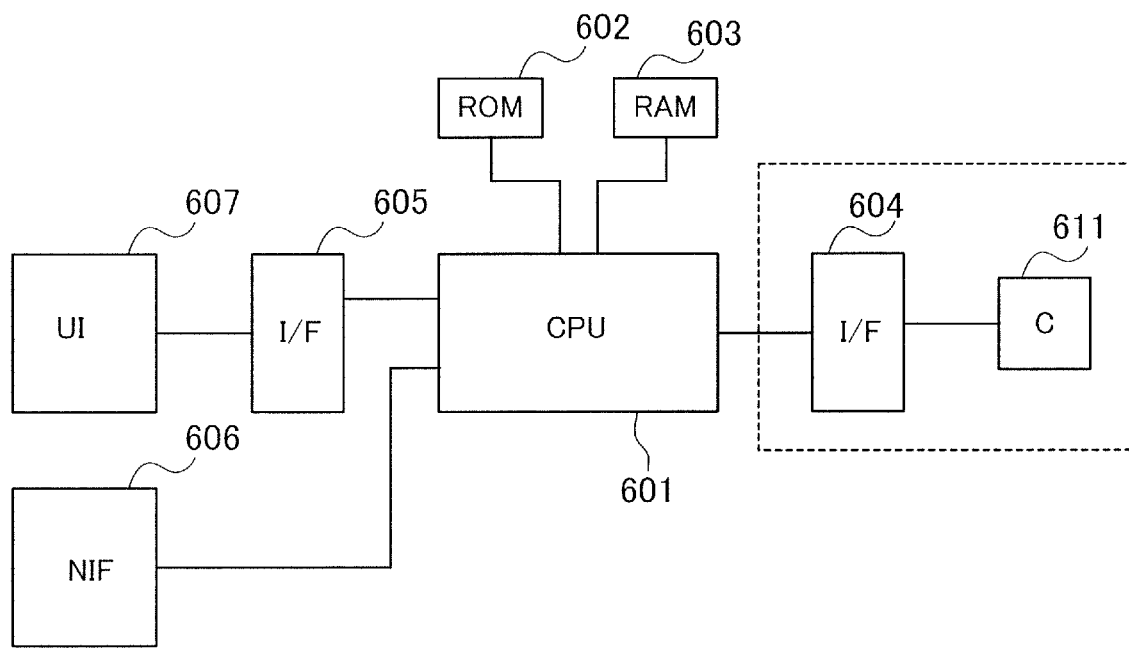
FIG. 10 is a block diagram illustrating a configuration of a control apparatus or an upper layer controller of the image capturing apparatus according to the exemplary embodiment of the present invention.

Here, FIG. 10 illustrates a configuration of a control apparatus of the image capturing apparatus 101 corresponding to each of the image capturing apparatuses 1011, 1012, 1013 . . . or of a control apparatus of the upper layer controller 110. The image processing portion 104, the image output portion 107, the storage priority imparting portion 108, and the image deletion portion 109 of the image capturing apparatus 101 of FIG. 1 can be realized by such a control apparatus as illustrated in FIG. 10. For example, these portions are realized by the CPU 601 executing a control program describing a control procedure that will be described later and stored in a read-only memory: ROM 602 or another computer-readable recording medium.

In the case where the control apparatus of FIG. 10 constitutes a control system of the image capturing apparatus 101, a camera 611 constituting the image capturing portion 102 illustrated in FIG. 1 is connected to a system bus of the CPU 601 via an interface 604. Examples of the camera 611 includes a digital camera. In addition, in the case where the control apparatus of FIG. 10 is a control system of the controller 110 or the terminal 180, a configuration excluding the camera 611 and the interface 604 that are enclosed by a broken line corresponds to the control system of the controller 110 or the terminal 180. In addition, in the case where the data storage 111 is configured as a so-called network attached storage: NAS connected to a network, a control system similar to the control system illustrated in FIG. 10 is provided in the data storage 111. In this case, for example, a configuration in which the camera 611 and the interface 604 enclosed by the broken line in FIG. 10 is excluded and an HDD or an SSD that is not illustrated is added as an external storage is a control system of the data storage 111.

The control apparatus of FIG. 10 includes the CPU 601 serving as a main controller, and the ROM 602 and a random access memory: RAM 603 serving as storage devices. The ROM 602 is configured to store a control program, constant information, and so forth of the CPU 601 for realizing a control procedure that will be described later. In addition, the RAM 603 is used as a work area or the like of the CPU 601 when executing the control procedure that will be described later.

To be noted, the control program of the CPU 601 for realizing the control procedure that will be described later can be also stored in an external storage device such as an HDD or an SSD, or in a storage portion such as the ROM 602. For example, the control program can be stored in an electrically erasable programmable read-only memory: EEPROM area of the ROM 602. In this case, the control program of the CPU 601 for realizing the control procedure that will be described later can be provided to each storage portion and updated to a new program or a different program via a network interface 606. Alternatively, the control program of the CPU 601 for realizing the control procedure that will be described later can be supplied to each storage portion and updated via various storage media such as magnetic disks, optical disks, and flash memories and drive devices thereof. The various storage media and storage portion storing the control program of the CPU 601 for realizing the control procedure described above constitute a computer-readable recording medium storing a control procedure of the present invention.

In FIG. 10, an input apparatus 607 serving as a user interface apparatus is connected to the CPU 601 via an interface 605. To be noted, the input apparatus 607 is not always necessary. The input apparatus 607 can be constituted by a terminal such as a handy terminal, by a device such as a keyboard, a display, or a pointing device, or by a control terminal including these. A user can set a condition for imparting a storage priority via the input apparatus 607.

In addition, the CPU 601 is connected to the network interface 606 serving as a communication portion. The CPU 601 can transmit and receive various control signals required for production control via the network interface 606. In this case, it can be considered that the network interface 606 is configured in accordance with a communication standard of wired communication such as IEEE 802.3 or a communication standard of wireless communication such as IEEE 802.11 or 802.15. The network interface 606 can be used for communication with an integral control apparatus such as the PLC disposed in the production line of the present exemplary embodiment and performs production management, a management server, or the like. Alternatively, in the case where other production apparatuses constituted by robot arms and XY stages are disposed in the production line, the network interface 606 can be used for communication with the other production apparatuses.

Figure 2:
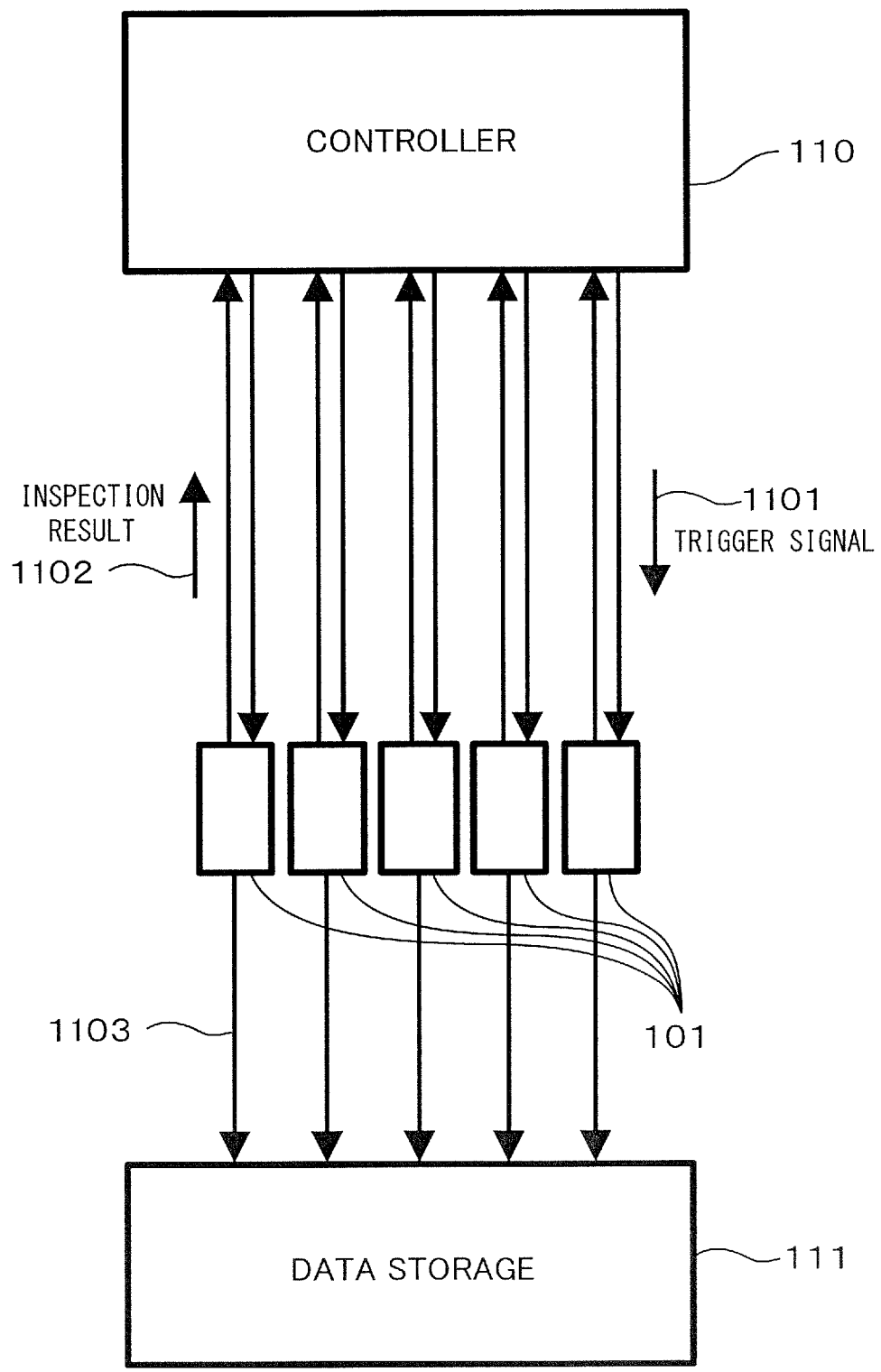
FIG. 2 is a block diagram illustrating a configuration including the image capturing apparatus and a data storage according to the exemplary embodiments of the present invention.

FIG. 2 illustrates a configuration of connection in the case where five image capturing apparatuses 101, which are expressed by 1011, 1012, 1013 . . . in FIG. 9, the controller 110, and the data storage 111 are disposed, for example, in the configuration like FIG. 9.

As illustrated in FIG. 2, the controller 110 is capable of outputting a trigger signal 1101 for instructing an image capturing timing to the five image capturing apparatuses 101, and thus causing each of the image capturing apparatuses 101 to capture an image of the object. Image data obtained by the image capturing portion 102 of the image capturing apparatus 101 illustrated in FIG. 1 is transmitted to and stored in the data storage 111 together with image capturing information and the storage priority of the present exemplary embodiment. The image capturing information includes identification information, image capturing date/time information, and the like. The identification information identifies the individual of the image capturing portion 102, which is a camera in this case, that has obtained the image data. The storage format of the image data can be arbitrary selected, and is preferably a non-compressed image data format in the case where the image data is used for management of the production system or the like. The image capturing information and storage priority may be stored in a header portion of the image data, and, in the case where the image capturing information and storage priority are in a format that can be associated with the image data, the image capturing information and storage priority may be stored as a file separate from the image data.

In addition, in each of the image capturing apparatuses 101, the image processing portion 104 performs some image processing, for example, inspection of the object, on the image data obtained by the image capturing portion 102, and transmits an inspection result 1102 thereof to the controller 110. In a production system as illustrated in FIG. 9, the controller 110 can monitor the state of each portion in the production line by using the inspection result 1102 received from each of the image capturing apparatuses 101. In this case, the inspection result 1102 corresponds to a result of inspection related to the state of a production apparatus or the state of a workpiece handled by the production apparatus when the production system as illustrated in FIG. 9 is used. Therefore, for example, in the case where a state deviated from a normal state of the object, that is, the production apparatus or the workpiece, is detected via the inspection result 1102, the controller 110 can detect this. In this case, the controller 110 can perform production control of, for example, outputting a warning or stopping the production apparatus or the entire production line as an emergency, by using the inspection result 1102.

In FIG. 2, the image capturing apparatuses 101 are connected to the controller 110 via a trigger input cable and a result output cable. In the present exemplary embodiment, trigger signals 1101 and inspection results 1102 are each communicated by 1 bit of "High" or "Low" of LVTTL. However, the connection may be built such that input of trigger and output of result can be each communicated by a plurality of bits. In addition, the input of trigger and output of result may be communicated by using a communication protocol.

In addition, the image capturing apparatuses 101 are connected to the data storage 111 via a network cable for outputting image data, a request for changing the storage priority, and a request for deleting image data. This output of image data, request for changing the storage priority, and request for deleting image data is communicated through a local area network: LAN. However, this output of image data, request for changing the storage priority, and request for deleting image data to the data storage 111 may be communicated by other forms of communication such as parallel communication and serial communication.

Figure 3:
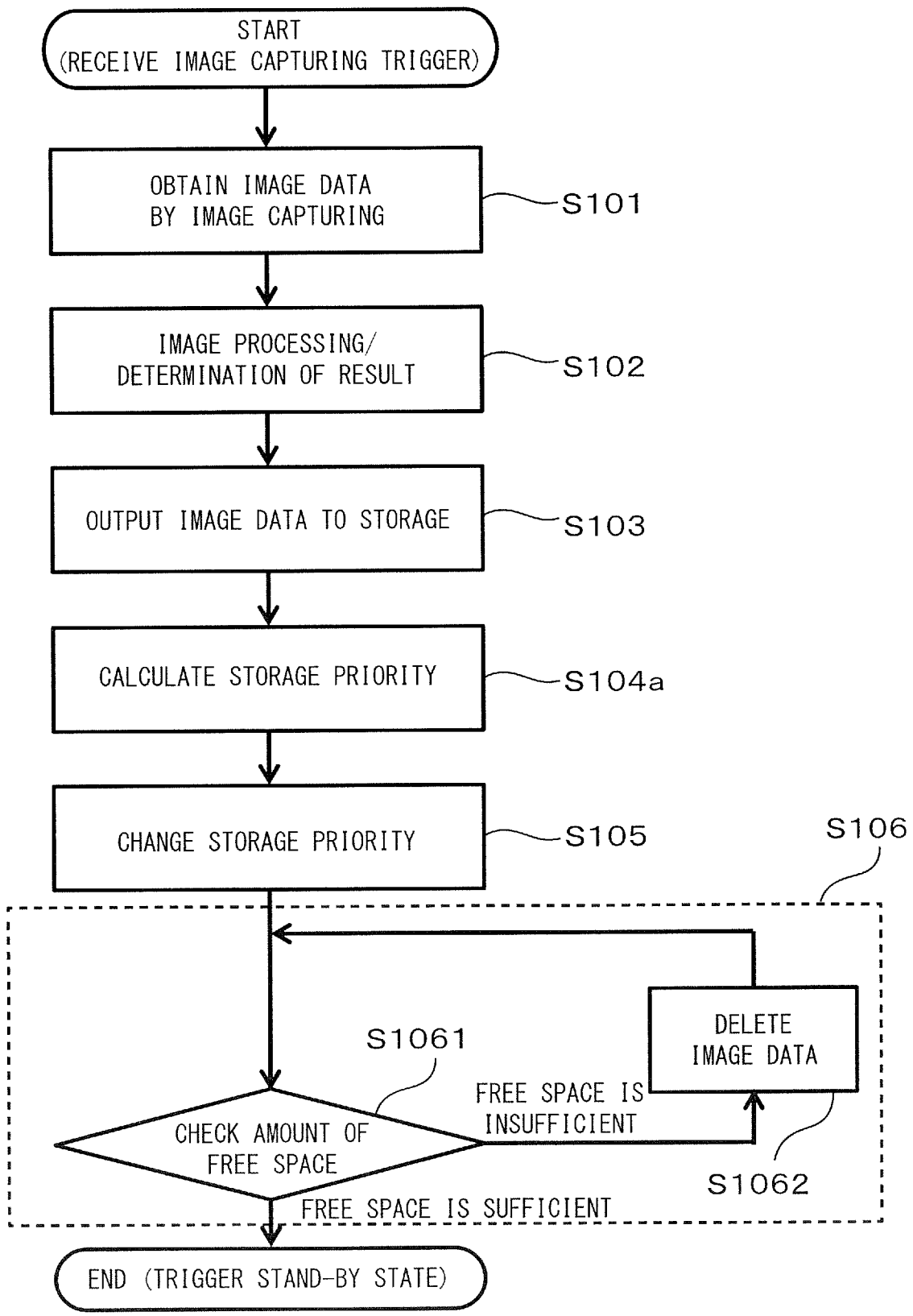
FIG. 3 is a flowchart illustrating a control procedure of image data management according to the exemplary embodiments of the present invention.

A flow of capturing an image of the object that is a target of inspection or measurement and outputting an inspection result and image data in the above configuration will be described. First, a control procedure of capturing an image of the object that is a target of inspection or measurement and outputting an inspection result and image data will be described with reference to a flowchart of FIG. 3. To be noted, although the control procedure of FIG. 3 is mainly performed by the image capturing apparatuses 101 each corresponding to one of the image capturing apparatuses 1011, 1012, 1013 . . . , the subject of control thereof is, for example, the CPU 601 illustrated in FIG. 10. The same applies to other flowcharts that will be described later. In addition, in step S106 indicated by a broken like in FIG. 3, a file of image data is deleted in accordance with the amount of free space in the storage with reference to the storage priority. The same applies to other flowcharts that will be described later. This step S106 may be performed by a control system of the controller 110 or the data storage 111 instead of the image deletion portion 109 of the image capturing apparatus 101. The same applies to other flowcharts that will be described later.

The controller 110 outputs a trigger signal to a specific image capturing apparatus 101 in accordance with a pre-programmed control sequence, for example, a control sequence of managing a production step performed by each production apparatus in the configuration of FIG. 9. For example, the controller 110 transmits the trigger signal 1101 illustrated in FIG. 2 in synchronization with a specific operation timing of the specific production apparatus. An image capturing apparatus 101 that has received the trigger signal 1101 performs image capturing by the image capturing portion 102 and generation of image data in step S101 serving as an image capturing step. At this time, the image capturing portion 102 captures an image of the object that is a target of inspection or measurement, generates image data, and outputs the image data to the image processing portion 104.

In step S102 serving as an image processing step, the image processing portion 104 performs image processing on the image data to calculate an image feature value, and outputs the inspection result 1102 of FIG. 2 obtained on the basis of the image feature value to the controller 110. The image data and the inspection result 1102 are output to the image output portion 107.

The controller 110 continues operation on the basis of the inspection result 1102 in accordance with an operation sequence designated in advance. In parallel with the operation of the controller 110, the image output portion 107 illustrated in FIG. 1 outputs the image data to the data storage 111 and outputs the inspection result 1102 to the storage priority imparting portion 108. This output of the image data and the inspection result 1102 from the image output portion 107 is performed in step S103 serving as an image output step. The data storage 111 stores the transmitted image data.

Next, in step S104a of FIG. 3 serving as a storage priority calculation step, the storage priority imparting portion 108 calculates the storage priority on the basis of the inspection result 1102. In step S104a, storage priorities of the image data output from the image output portion 107 to the data storage 111 in step S103 and image data obtained by the same image capturing portion 102 in the past and already stored in the data storage 111 are calculated. To be noted, the storage priority calculation step described above can be also referred to as, in other words, a storage priority obtaining step of obtaining the storage priority of image data.

In step S105 serving as a storage priority imparting step, a request for changing the storage priority generated on the basis of the calculation is output to the data storage 111. Here, the data storage 111 is requested to at least impart storage priority to the image data output from the image output portion 107 to the data storage 111 in step S103. In addition, in the case where there arises necessity to change the storage priority of the image data obtained by the same image capturing portion 102 in the past and already stored in the data storage 111 for the following reason, a change request for this change is output to the data storage 111. In accordance with this, the data storage 111 changes the storage priority of the image data on the basis of the request for changing the storage priority of the image data.

That is, the storage priority imparting step S105 includes an imparting step of associating image data obtained by an image capturing portion with a storage priority obtained for the image data and storing the image data and the storage priority in the storage device, and an updating step of, in the case where an object whose image is captured by the image capturing portion is in a specific state, updating, on a basis of detection of the specific state, a storage priority associated with image data comprising at least image data stored in the storage device before image data in which the object is determined as being in the specific state is stored.

Steps S103, S104a, and S105 have been described above in this order for the sake of easier description. However, the image data may be output to the data storage 111 in step S103 after the calculation of storage priority of step S104a is performed on the image data obtained in step S101. Alternatively, for example, keeping the order of the steps as illustrated in FIG. 3, 0, which is the lowest storage priority, may be imparted to the image data as a default storage priority and the image data may be output in step S103. In these cases, the imparting step is step S103.

In addition, in step S106 of FIG. 3 serving as an image deletion step, whether the amount of free space, that is, remaining capacity of the data storage 111 is very small is determined. Here, for example, in step S1061, the image deletion portion 109 of the image capturing apparatus 101 illustrated in FIG. 1 accesses the data storage 111, and checks whether the amount of free space, that is, remaining capacity thereof is very small, that is, equal to or smaller than a predetermined threshold value. Here, whether the amount of free space is smaller than the threshold value may be alternatively checked. Then, in the case where the amount of free space is very small, in step S1062, the data storage 111 is caused to sequentially delete the image data in the order from pieces of image data having lower storage priority to pieces of image data having higher storage priority until the amount of free space becomes above the threshold value associating the small amount of the remaining capacity of the data storage. In addition, in the case where the amount of free space is larger than the threshold value, this deletion request is not provided. At this time, in the case where there are a plurality of pieces of image data having storage priority of the same value, older pieces of image data among the pieces of image data having the same storage priority are deleted earlier on the basis of the image capturing date/time recorded in the image capturing information.

In the present exemplary embodiment, in the case where an inspection result of image data obtained by the image capturing portion 102 of a specific image capturing apparatus 101 indicates product deficiency or measurement abnormality, the storage priority of the image data obtained by the specific image capturing portion 102 is updated to a higher value. In the data storage 111, the image data obtained by the specific image capturing apparatus 101 can be identified by, for example, the image capturing information of the image data including information from which the image capturing portion 102 can be identified. This image capturing information includes information about image capturing date/time, that is, an image capturing timing. Such processing of generating image capturing information and imparting or associating the image capturing information to or with the image data can be performed by, for example, the storage priority imparting portion 108.

In addition, in the case where the inspection result indicates product deficiency or measurement abnormality, the storage priority of the image data obtained by the specific image capturing apparatus 101 is updated to a higher value. In this case, storage priorities of all pieces or some pieces with certain intervals therebetween of image data obtained by the image capturing apparatus 101 in a period in the past designated in advance are increased.

In addition, the storage priority imparting portion 108 may inspect image data in a period in the past designated in advance, and may perform processing of updating the storage priority of image data obtained by the specific image capturing portion 102 in the case where there is a piece of image data indicating product deficiency or measurement abnormality in the image data. In this case, the processing of updating the storage priority of the image data may be performed also in the case where the inspection result of image data obtained by the image capturing apparatus 101 this time does not indicate production deficiency or measurement abnormality.

According to the processing described above, in the case where the amount of free space in the data storage 111 is very small and deletion of image data is required, the storage priority of image data indicating production deficiency, measurement abnormality, or a sign thereof is updated to a higher value. As a result of this, image data indicating production deficiency, measurement abnormality, or a sign thereof is preferentially stored, and thus image data of high importance can be stored for a long period without being lost in operation analysis or the like performed thereafter.

Details of elements shown in FIGS. 1 and 2, or further in FIG. 9 will be described herein. First, the controller 110 and the data storage 111 serving as peripheral devices connected to the image capturing apparatuses 101 will be described herein.

The controller 110 is, for example, in such a production system as illustrated in FIG. 9, a known PLC. In this case, the controller 110 is capable of performing communication with one or a plurality of devices connected thereto by LVTTL or a specific protocol in accordance with an operation sequence designated by a dedicated description language.

Here, it is assumed that five image capturing apparatuses 101 are connected to the controller 110. The image processing portion 104 of each of the image capturing apparatuses 101 performs, for example, presence/absence inspection of the object. In this case, for example, the image processing portion 104 determines whether the object that is an inspection target is present or not present in a captured image region. Here, presence of the object is expressed as "OK", and absence of the object is expressed as "NG".

In addition, the controller 110 is capable of individually outputting 1-bit trigger signals to the five image capturing apparatuses 101 at arbitrary timing in accordance with a control sequence of the production line or the like. The 1-bit trigger signals each indicate an instruction of start of inspection. In addition, the controller 110 is capable of individually receiving 1-bit result signals from the five image capturing apparatuses 101. The 1-bit result signals are each either "High" or "Low" respectively indicating the image inspection being "OK" or "NG". Here, description will be given assuming that the image inspection performed in accordance with an image feature value calculated by the image processing portion 104 is presence/absence inspection of the object that is a target of measurement. However, the image inspection may be position inspection, phase inspection, appearance inspection for foreign matter, stain, defect, or the like, application inspection of a liquid, two-dimensional/three-dimensional shape inspection, or the like instead of the presence/absence inspection of the object that is the target of measurement. In addition, the plurality of image capturing apparatuses 101 may each perform different inspection.

The data storage 111 has an NAS configuration in which the data storage 111 can be connected to, for example, a device that reads and writes data via a network. Examples of the device includes the image capturing apparatuses 101 and the controller 110. Devices connected to the data storage 111 via a LAN, that is, the image capturing apparatuses 101 and the controller 110 are capable of performing processing such as addition, changing, and deletion of data. In the present exemplary embodiment, the data storage 111 has a capacity of, for example, 32 TB, and includes a LAN interface capable of communicating with the five image capturing apparatuses 101.

Next, elements of the image capturing apparatus 101 illustrated in FIG. 1 will be described. In the present exemplary embodiment, for example, the image capturing portion 102 is a digital camera that has a spatial resolution of 2448×2058=about 5 mega pixels, each pixel having a bit depth of 8 bit, captures a gray scale image, and outputs image data. To be noted, although one image captured by the image capturing portion 102 has a spatial resolution of about 5 mega pixels and a bit depth of 8 bit in the present exemplary embodiment, of course the spatial resolution and the bit depth are not limited to these specific values.

In addition, in the present exemplary embodiment, a case where a device such as a smart camera in which an image capturing portion and a processing function are integrated is used as an image capturing apparatus is described. However, a combination of a digital camera serving as the image capturing portion 102 and a separate image processing portion may be used as the image capturing apparatus 101. The image capturing portion 102 writes various setting values for controlling image capturing in a register included in the image capturing portion 102 by communication via a serial peripheral interface: SPI or the like, and reads out an image signal of about 5 mega pixels from the image sensor.

The image capturing portion 102 includes a trigger input, and is capable of taking a trigger stand-by state in which the image capturing portion 102 can immediately perform image capturing when the trigger signal 1101 is input. The image capturing portion 102 performs the image capturing step S101 shown in FIG. 3. In the image capturing step S101, the image capturing portion 102 is set to take the trigger stand-by state by writing a setting value for causing the image capturing portion 102 to take the trigger stand-by state in the register included in the image capturing portion 102, and when the trigger signal 1101 is input, image capturing is performed to obtain image data. The image data obtained by image capturing by the image capturing portion 102 is output to the image processing portion 104 that will be described later.

In the present exemplary embodiment, the image processing portion 104, the image output portion 107, the storage priority imparting portion 108, the image deletion portion 109 of the image capturing apparatus 101 are realized by such a control apparatus as illustrated in FIG. 10 including a CPU, a memory, a storage device, and an external interface.

To be noted, description will be given on the premise that the image processing portion 104, the image output portion 107, the storage priority imparting portion 108, and the image deletion portion 109 are realized by arithmetic processing by a CPU in the present exemplary embodiment. However, these portions may be realized by other known devices having a processing function such as known general-purpose logic circuits. Examples of such devices include microcomputers, digital signal processors: DSPs, and field programmable gate arrays: FPGAs.

The image processing portion 104 performs the image processing step S102. In the image processing step S102, image processing is performed on the image data to calculate an image feature value, and an inspection result is obtained on the basis of the image feature value.

In the present exemplary embodiment, the image processing performed by the image processing portion 104 is presence/absence inspection of the object, and an area of binary image of the image data is calculated as the image feature value used for inspection. In the calculation of this area of binary image, first, the image data is binarized.

The image data of the present exemplary embodiment has a spatial resolution of 2448×2058=about 5 mega pixels, each pixel having a bit depth of 8 bit. That is, each pixel has a luminance value from 0 to 255 in gray scale. In the binarization of the image data, a binary image is generated by converting the luminance value of each pixel of the image data, which is in the range of 0 to 255, into 1 in the case where the luminance value of the pixel is equal to or greater than a set threshold value and into "0" in the case where the luminance value of the pixel is smaller than the threshold value.

When binarizing an image, for example, a luminance histogram of the image is referred to, and a middle point between a bright peak and a dark peak is set as the threshold value. In the present exemplary embodiment, the threshold value of the binarization is 128. Next, the area of binary image is calculated. The area of binary image is calculated by adding app all pixel values of the binary image generated by the binarization. The inspection result determined on the basis of the area of binary image thus calculated is output to the controller 110 and the image output portion 107. To be noted, although description will be given on the premise that the calculation of the area of binary image is performed as the image processing in the present exemplary embodiment, various known filter processing may be performed, or another feature value different from the area of binary image may be calculated by known various image processing. In addition, regarding how the area of binary image is calculated, the threshold value of binarization may be automatically determined by using a known dynamic threshold method or the like instead of using a preset value. In addition, the calculated image feature value is not limited to one feature value, and a plurality of different image feature values may be calculated.

The image processing portion 104 generates an inspection result on the basis of the calculated image feature value in the image processing step S102 of FIG. 3. In the present exemplary embodiment, for example, the inspection result is generated, by comparing the calculated area of binary image with a preset threshold value, such that the inspection result of the object based on the image processing is "OK", which corresponds to good, in the case where the area of binary image is equal to or greater than the preset threshold value, and the inspection result is "NG", which corresponds to not good, in the case where the area of binary image is smaller than the threshold value. This inspection corresponds to, for example, a process of determining whether an object having a characteristic area of binary image is present. Examples of the object include a workpiece 61 and part of the robot apparatuses 31, 32 . . . .

As an example of how the threshold value of the area of binary image is determined, a plurality of binary images whose inspection results are "NG" and a plurality of binary images whose inspection results are "OK" are provided, the average value of areas of binary images of the "OK" binary images and the average value of areas of binary images of the "NG" binary images are respectively obtained, and a value obtained by adding up the two average values and dividing the sum by 2 is set as the threshold value.

To be noted, for example, as can be seen in known product inspection, erroneously determining "NG" corresponding to a defective product as "OK" corresponding to a good product has a higher risk than erroneously determining "OK" as "NG", from the viewpoint of prevention of releasing a defective product. In the case where there is an intention of making the determination result biased towards one of "NG" and "OK", for example, where the threshold value is shifted in a direction in which "NG" is more likely to be erroneously determined as "OK", the value obtained by adding up the two average values and dividing the sum by 2 may be multiplied by a value corresponding to the risk. In the present exemplary embodiment, the threshold value of the area of binary image for determining the inspection result is set to 2,000,000. The inspection result determined in this manner is output to the image output portion 107. To be noted, the threshold value of the area of binary image may be automatically determined by some calculation based on a characteristic value of the object that is a workpiece or part of a robot apparatus, or various known methods may be used as the determination method of the inspection result.

The image output portion 107 performs the image output step S103. In the image output step S103, the image data generated by the image capturing portion 102 is output to the data storage 111. To be noted, the image output portion 107 associates the image data with the storage priority, transmits the image data and storage priority to the data storage 111, and thus causes the data storage 111 to store the image data and storage priority. In this case, the image data is associated with the storage priority by, for example, storing the storage priority in a text file having the same name as the image file, or writing the storage priority in the header of the image data. In the gist of the present exemplary embodiment, of course, data in a portion corresponding to the storage priority can be freely rewritten without affecting the main portion of the image data.

In the present exemplary embodiment, the image output portion 107 is a LAN interface provided in a computer, and an image file is transmitted from the computer to the data storage 111 via a LAN in the in the image output step S103. In addition, in the description below, the storage priority is configured be recorded as header information of the image file, and the storage priority is written as an initial value when transmitting the image file to the storage 111. For example, the initial value is 0 corresponding to the lowest storage priority. To be noted, the image output portion 107 is not limited to the LAN interface, and may be a known interface for serial communication such as a universal serial bus: USB. In addition, as described above, the storage priority may be provided as a text file associated with the image file instead of as the header information of the image file.

The storage priority imparting portion 108 performs the storage priority calculation step S104a and the storage priority imparting step S105 illustrated in FIG. 3. In the storage priority calculation step S104a inspection results of data stored in the data storage 111 are referred to, and the storage priority of image data corresponding to an "NG" inspection result is updated to a higher value. In this case, for example, storage priorities of all pieces of image data obtained in a preset specific period in the past are continuously updated to higher values. In this case, for example, processing of adding +50 to the value of the storage priority is performed, such as updating 0 to 50 and 50 to 100. The value added herein may be different from 50. In addition, storage priorities of pieces of image data with preset sampling intervals therebetween may be updated instead of continuously updating all pieces of image data obtained in the preset period in the past.

In the storage priority imparting step S105 of FIG. 3, the storage priority of the image data stored in the data storage 111 is changed on the basis of the storage priority determined in the storage priority calculation step S104a of FIG. 3. In the present exemplary embodiment, the storage priority of image data in a specific period in the past is exclusively updated to a higher value. For example, the specific period is set to 2 weeks, and storage priorities of all pieces of image data in this period in the past are updated to higher values. As a result of this, for example, storage priorities of all pieces of image data obtained by the specific image capturing portion 102 in the recent two weeks are selectively and continuously updated to higher values.

The range of the storage priority is set to, for example, 0 to 100, in which 0 corresponds to the lowest storage priority and 100 corresponds to the highest storage priority. For example, in the case where the inspection result from the inspection result output portion 105 is "OK", the storage priority imparting portion 108 does not update the storage priority of the image data stored in the data storage 111 after the image output portion 107 outputs the image data to the data storage 111. Alternatively, in the case where the inspection result from the inspection result output portion 105 is "OK", the lowest storage priority 0 is used.

In contrast, in the case where the inspection result from the inspection result output portion 105 is "NG", for example, the storage priority imparting portion 108 imparts the storage priority of 100 to the output image data after the image output portion 107 outputs the image data to the data storage 111. Then, the storage priority imparting portion 108 imparts the storage priority of 50 to all pieces of image data obtained in the recent two weeks, or adds +50 to storage priorities of pieces of image data obtained in the recent two weeks. To be noted, although the imparting of storage priority or update of storage priority is performed on all pieces of image data obtained in the specific period by the same image capturing portion 102 in the present exemplary embodiment, for example, the imparting of storage priority or update of storage priority may be performed on pieces of image data with specific intervals therebetween, for example, on every 10 pieces of image data. In the case of imparting storage priority at specific intervals like this, the intervals may be constant or dynamic values that change in accordance with the situation.

To be noted, although three values of 0, 50, and 100 are used for the storage priority as described above in the present exemplary embodiment, the storage priority may be controlled to an intermediate value on the basis of the occurrence timing of "NG" or information of an external device. In addition, one of two values of the minimum value and the maximum value may be imparted as the storage priority. For example, 0 or 1, or 0 or 100 may be imparted as the storage priority. In addition, image data in which "NG" has occurred may be stored in the data storage 111 in association with data indicating the occurrence of "NG". Then, by imparting storage priority to current image data in the case where "NG" has occurred in a piece of image data obtained in the past at a certain period from now, storage priorities of pieces of image data obtained in the certain period after the occurrence of "NG" are updated to higher values. To be noted, in the case where the pieces of image data obtained after the occurrence of "NG" is not necessary, storage priorities may be imparted to only pieces of image data obtained before the occurrence of "NG".

In addition, when imparting the storage priority to the image data, date and time of imparting the storage priority and an application condition of imparting the storage priority may be also stored in the data storage 111 as log information. For example, history information of change in the storage priority in the past is stored in the data storage 111 as log information. For example, the history information includes date, time, storage priority, an application condition of in which the storage priority has been changed, and so forth.

The image deletion portion 109 performs the image deletion step S106 of FIG. 3. In the image deletion step S106, whether the amount of free space in the data storage 111 is very small, that is, smaller than the predetermined threshold value or equal to or smaller than the predetermined threshold value, is checked. In the case where the amount of free space is very small, the image data is sequentially deleted starting from pieces of image data having lower storage priorities until the amount of free space no longer satisfies the condition to be determined as very small. At this time, in the case where there are a plurality of pieces of image data having storage priorities of equal values, the image capturing information stored in the data storage 111 is referred to, and pieces of image data are sequentially deleted in the order from pieces of image data having older image capturing date/time to pieces of image data having newer image capturing date/time among pieces of image data having the same storage priority.

To be noted, in the case where the amount of free space is not very small, the deletion processing described above is not performed as a matter of course. In the present exemplary embodiment, for example, 10% of the total capacity, which is 3.2 TB in the example described above, of the data storage 111 is set as the threshold value for determining the amount of free space as being very small.

In the image deletion step S106 of FIG. 3, the oldest piece of image data among pieces of image data having the lowest storage priority, which is 0 in the present exemplary embodiment, is deleted when the amount of free space in the data storage 111 is below 10%. Then, pieces of image data are further sequentially deleted in the order from older pieces to newer pieces while monitoring the amount of free space in the data storage 111 until the amount of free space becomes equal to or greater than 10%. In the case where the amount of free space is still below 10% after all pieces of image data having the storage priority of 0 have been deleted, pieces of image data having the second lowest storage priority, which is 100 in the present exemplary embodiment, are sequentially deleted in the order from older pieces to newer pieces among the pieces of image data having the second lowest storage priority.

To be noted, although an example in which image data is deleted when the amount of free space is insufficient has been described in the present exemplary embodiment, in the case where enormous amount of image data needs to be deleted and thus it takes a long time for the deletion processing, the deletion processing may be suspended while there is a large processing load on the processing system, and may be collectively performed when the processing load is small. In addition, a time period in which the image capturing apparatuses 101 are not operated may be determined in advance, and the image data may be deleted in this time period.

In this format of deletion of image data, the image deletion step S106 of FIG. 3 may be performed by the control apparatus of the controller 110 and the data storage 111 instead of the image deletion portion 109 of the image capturing apparatus 101. In this case, for example, obtaining, on the basis of an input signal from an upper layer production management terminal or the PLC, a timing at which image capturing apparatuses do not operate and thus deleting the image data can be considered. In addition, the production line being in a pause state may be detected from output information from an optical sensor, a microphone, or a monitoring camera, for example, the sensors 71, 72 . . . of FIG. 9, and the image data may be deleted while the production line is in the pause state.

In addition, when the image data is deleted, the file name of the image data, the date/time of the deletion, and the history information of change in the storage priority in the past may be stored as log information. For example, the history information includes date, time, storage priority, and an application condition in which the storage priority has been changed. This log information can be stored in, for example, the data storage 111. Since the cause of deletion of the image data can be specified by referring to such log information, the condition for imparting the storage priority can be reconsidered in the case where an important image file is deleted.

The above processing is performed in a similar manner in each of the five image capturing apparatuses 101 illustrated in FIG. 2. As a result of this, according to the present exemplary embodiment, not only pieces of image data in which "NG" has occurred but also pieces of image data corresponding to a certain period before and after the occurrence of the "NG" image can be kept in the data storage 111. Accordingly, image data necessary for analyzing the cause of product deficiency and measurement abnormality can be preferentially kept for a long period without deleting necessary image data as long as possible even in the case where the capacity of the data storage 111 is limited.

Different image processing performed by the image processing portion 104, different inspection based thereon of the state of the object, and update processing of storage priority will be described below as second to fifth exemplary embodiments. In the description below, the hardware configuration is similar to the configuration illustrated in FIGS. 1, 2, 9, and 10, and redundant description will be omitted unless the description is particularly necessary. In addition, regarding the software, the overall flow of the control procedure of the above-described exemplary embodiment illustrated in FIG. 3 is also similar to control procedures of the second to fifth exemplary embodiment, which respectively correspond to FIGS. 4 to 8. In addition, similarly to the above-described exemplary embodiment, the subject of control that performs the control procedure is, for example, a CPU of a control apparatus that constitutes the control system of the image capturing apparatus 101, or the control system of the controller 110 and the data storage 111, for example, the CPU 601 of the control apparatus illustrated in FIG. 10 also in the second to fifth exemplary embodiments. In addition, the control procedure is stored in, for example, the ROM 602 of the control apparatus illustrated in FIG. 10 or another computer-readable recording medium. In the second to fifth exemplary embodiments, description will be focused on storage priority calculation steps S104b to S104e unique to respective exemplary embodiments in the control procedures illustrated in FIGS. 4 to 8.

Second Exemplary Embodiment

In the first exemplary embodiment described above, in the case where the inspection result of the image capturing apparatus actually indicates "NG" that corresponds to production deficiency or measurement abnormality, the storage priority is determined or updated such that pieces of image data obtained immediately before and after the occurrence of "NG" are preferentially stored.

However, in an actual site such as a production factory, even when production deficiency or measurement abnormality has not occurred, there is some case in which production deficiency and measurement abnormality become potentially more likely to occur due to malfunction of the apparatus or sudden change in the product. In this case, production free from troubles can be continued if the malfunction of the apparatus or sudden change in the product that causes production deficiency and measurement abnormality is investigated and corrected before product deficiency or measurement abnormality actually occurs. However, according to the first exemplary embodiment, there is a possibility that only pieces of image data obtained around the time of indication of occurrence of production deficiency or measurement abnormality, for example, two weeks before and after the occurrence, is preferentially kept. Therefore, there is a possibility that the image data that is kept is not sufficient for analysis and inspection of a potential trouble that has occurred in the past.

Therefore, in the second exemplary embodiment, a control procedure in which increase in the risk of occurrence of production deficiency or measurement abnormality can be detected on the basis of whether the image feature value used for determination of the inspection result is within a threshold range and pieces of image data obtained around that time can be preferentially kept by being triggered by the increase even in the case where production deficiency or measurement abnormality has not occurred will be described.

Here, a specific example of the image feature value for determining the inspection result becoming closer to a determination value will be described. Here, as the presence/absence inspection of a part, image data obtained by capturing an image of a black tray carrying a white part serving as a workpiece is binarized. Here, an inspection step of the object in which determination is made as "OK" in the case where the area of a white portion corresponding to the part of the binary image exceeds 2,000,000 and determination is made as "NG" in the case where the area of the binary image is equal to or smaller than 2,000,000 is employed. That is, the area of the binary image=2,000,000 is set as a determination value used for determination of the inspection.

It is assumed that, at the initial stage after establishing the production system and inspection environment, the binary image area of an "OK" image in the object inspection by this image processing is 3,000,000 with a standard deviation of $\sigma=100,000$. In addition, similarly, it is assumed that the binary image area of an "NG" image is 1,000,000 with a standard deviation of $\sigma=30,000$, and the determination of "OK" and "NG" is stable.

Then, at a certain timing, for example, the color of the tray is changed from black to a bright translucent color. Because of this, the luminance of a portion corresponding to the tray in a captured image increases, and the binary image area of an "NG" image is changed to about 1,900,000. In this case, the binary image area of an "NG" image has become close to 2,000,000, and the possibility of erroneously determining an image that does not include a part and is supposed to be determined as "NG" as "OK" increases. Similar erroneous determination can occur in the case where, for example, a new apparatus is installed in the vicinity at a certain timing and the luminance in the captured image changes due to light emitted from the apparatus. In addition, it is assumed that, in the presence/absence inspection of the part, fluorescence light on the ceiling of the assembly site goes out at a certain timing, the luminance of the part portion in the captured image decreases, and the binary image area of an "OK" image has become about 2,100,000. In this case, the possibility of erroneously determining an image that includes the part and is supposed to be determined as "OK" as "NG" increases. Similar erroneous determination can occur in the presence/absence inspection of the part also in the case where, for example, the surface state of the part changes and the luminance of the part portion in the captured image changes due to difference in a production lot, difference in the cavity of a mold, or short-term or long-term change of the mold.

If pieces of image data obtained around the time of change in the image feature value, which is the binary image area herein, of the image data can be stored with the change as a trigger, occurrence of change in the state of the tray, the state of the part, or the outer environment can be found in the inspection and analysis performed later with reference to the image data. Then, it becomes possible to take measure by, for example, optimizing the tray, part, or outer environment, or changing the image processing algorithm.

An example of the presence/absence inspection of the object by using the area of binary image as the image feature value used for determination of inspection has been shown. However, for example, using approach of a matching score to a threshold value as a trigger in inspection of performing known pattern matching and determining OK or NG in accordance with the value of matching score can be considered, and using another image feature value as a trigger can be also considered. In addition, using a format and image capturing setting of an image file as a feature value of image data can be also considered. Examples of the format include an extension, a spatial resolution, a bit depth, and color/grayscale. Examples of the image capturing setting include exposure time, gain, a cut-out setting, an effect, a filter, and an amount of light. Alternatively, the size of an image file obtained by image capturing, date/time of generation of the image file, difference in image capturing time between image files, an accumulated number of captured images, a degree of matching between image files, and the like may be used as a feature value of image data and a trigger for updating the storage priority.

Figure 4:
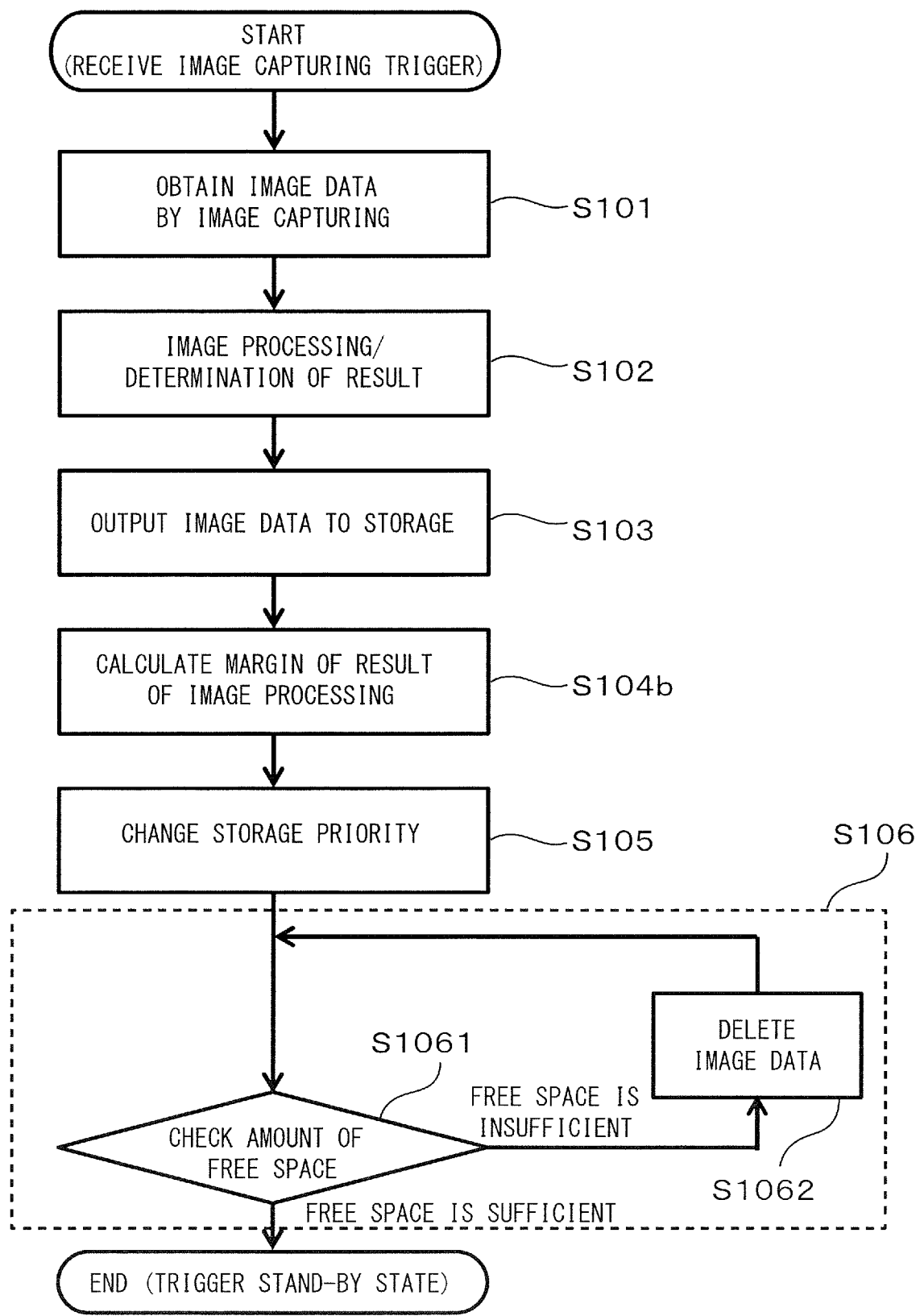
FIG. 4 is a flowchart illustrating a different control procedure of image data management according to the exemplary embodiments of the present invention.

FIG. 4 illustrates a control procedure of the second exemplary embodiment. FIG. 4 is different from FIG. 3 in the contents of a storage priority calculation step S104b and the image processing step S102.

In the control procedure of FIG. 4, the transmission of the trigger signal 1101 from the controller 110 to the image capturing apparatus 101 and the image capturing step S101 are performed in a similar manner to the first exemplary embodiment. The image capturing portion 102 captures an image of the object to generate image data, and outputs the image data to the image processing portion 104. The image capturing and generation of image data in the image capturing portion 102 and the image processing in the image processing portion 104 are performed in the image processing step S102 similarly to the first exemplary embodiment. The image processing portion 104 performs image processing necessary for outputting an inspection result on the image data to calculate an image feature value, and outputs the inspection result 1102 based on the image feature value to the controller 110. In addition, the image processing portion 104 is capable of generating the inspection result 1102 on the basis of the image feature value, outputting the inspection result to the controller 110, and outputting the image feature value, the image data, and the inspection result to the image output portion 107.

The controller 110 continues operation on the basis of an operation sequence designated in advance on the basis of the inspection result. Meanwhile, the image output portion 107 outputs the image data to the data storage 111 and the image feature value and the inspection result to the storage priority imparting portion 108. Then, in the image output step S103, the image data and the image feature value are transmitted from the image output portion 107 to the data storage 111 and are stored in the data storage 111.

Next, in step S104b serving as a storage priority calculation step in FIG. 4, the storage priority imparting portion 108 determines the storage priority of the image data stored in the data storage 111. Here, the image output portion 107 determines the storage priority of the image data output from the image output portion 107 to the data storage 111 this time or in the past. Then, a request for changing the storage priority of stored image data is output to the data storage 111. Determination of the storage priority of pieces of image data obtained in the past performed in the storage priority imparting portion 108 is performed in the storage priority calculation step S104b.

The output of the request for changing the storage priority performed in the storage priority imparting portion 108 is performed in a storage priority imparting step S105. The data storage 111 changes the storage priority of image data on the basis of the request for changing the storage priority of image data. The change in the storage priority of image data performed in the data storage 111 is performed in the storage priority imparting step S105. In FIG. 4, the image deletion step S106 is configured in a similar manner to FIG. 3. Redundant description is omitted herein.

In addition, in the present exemplary embodiment, the storage priority is updated to a higher value in the case where the inspection result based on the image feature value calculated from the image data obtained by image capturing by the image capturing portion 102 indicates production deficiency or measurement abnormality or where the image feature value indicates a sign of occurrence of production deficiency or measurement abnormality. In addition, identification information that specifies the date/time of image capturing of the image data and the image capturing portion used for the image capturing is stored in the data storage 111 as a part of image capturing information. In addition, in the case where the inspection result indicates production deficiency or measurement abnormality or where the image feature value indicates a sign of occurrence of production deficiency or measurement abnormality, processing is performed to update storage priorities of pieces of image data obtained in a specific period in the past to higher values.

In addition, the control to change the storage priority of image data to a higher value may be performed in the case where pieces of image data obtained by image capturing by the image capturing portion 102 in a period in the past designated in advance include pieces of image data indicating production deficiency or measurement abnormality or a sign of occurrence of production deficiency or measurement abnormality. In the image deletion step S106, the image deletion portion 109 accesses the data storage 111 and checks whether the amount of free space in the data storage 111 is very small, that is, smaller than a predetermined threshold value or equal to or smaller than the predetermined threshold value. In the case where the amount of free space is very small, the image data is deleted until the amount of free space becomes equal to or greater than the threshold value or above the threshold value in the order from pieces of image data having lower storage priority to pieces of image data having higher storage priority, similarly to the first exemplary embodiment.

According to the second exemplary embodiment, pieces of image data in which possibility of occurrence of production deficiency or measurement abnormality has risen can be preferentially stored by the above processing even in the case where production deficiency or measurement abnormality has not occurred. Therefore, even in the case where the capacity of the data storage 111 is limited, image data necessary for analyzing the cause of production deficiency or measurement abnormality can be preferentially stored for a long period without deleting the image data as long as possible.

As described above, also in the second exemplary embodiment, the hardware configuration constituted by the image capturing apparatuses 101, the controller 110, and the data storage 111 is similar to the hardware configuration shown in FIGS. 1, 2, 9, and 10. In addition, the image capturing portion 102, the image processing portion 104, the image output portion 107, and the image deletion portion 109 are similar to the first exemplary embodiment, and therefore descriptions thereof are omitted. The description below will be focused on the storage priority imparting portion 108 of the image capturing apparatus 101, which performs step S104b of FIG. 4.

The storage priority imparting portion 108 performs the storage priority calculation step S104b or further the storage priority imparting step S105. In the storage priority calculation step S104b, the inspection result of the image data stored in the data storage 111 is referred to, and the storage priority of a piece of image data whose inspection result is "NG" is updated to a higher value. In addition, storage priorities of pieces of image data obtained in the past at a preset period from now are determined or updated to higher values continuously or at preset sampling intervals.

In addition, storage priorities of pieces of image data obtained in the past at a preset period from now are determined or updated to higher values while changing storage priorities of pieces of image data whose image feature values calculated by the image processing portion 104 are above a set threshold value. In the storage priority imparting step S105, the storage priority of the image data stored in the data storage 111 is updated on the basis of the storage priority determined in the storage priority calculation step S104b. In the second exemplary embodiment, the set period for update of the storage priority of the image data to a higher value is set as two weeks similarly to the first exemplary embodiment described above, and control is performed to continuously change storage priorities of pieces of image data obtained in the set period in the past to be higher values. In addition, it is also the same that the range of the storage priority is set to 0 to 100, 0 corresponds to the lowest storage priority, and 100 corresponds to the highest storage priority.

Here, a specific way of determining the storage priority of the second exemplary embodiment will be described. In the second exemplary embodiment, for example, a binary image area corresponding to the object that is a target of measurement is used as a feature value of the image data. For example, it is assumed that the average value of the binary image area of an "OK" image is 3,000,000 and the standard deviation thereof is σ=100,000 in a normal state. In this case, results of 99.7% of "OK" determination are supposed to be at least larger than a value smaller than the average value in the normal state by a difference equal to or smaller than 3σ, which is 3× standard deviation, and thus an image can be stored as an image corresponding to an event where the binary image area is unexpectedly small by detecting the binary image area being smaller than the average value of the normal state by a difference greater than 3σ.

To be noted, the threshold value may be set by using 1σ or 2σ instead of 3σ in accordance with the accuracy of determination by a system or the capacity of the storage, and of course 4σ and 5σ can be used too. In addition, the storage priority of a piece of image data determined as "OK" may be also increased in the case where the binary image area is larger than the average value by a difference of +3σ or more, in which the binary image area is too large, and the storage priority of a piece of image data determined as "NG" may be increased in the case where the binary image area is larger or smaller than the average value in the normal state by a difference larger than 3σ. In the present exemplary embodiment, a value of 2,700,000 obtained by subtracting 3σ=300,000 from the average value 3,000,000 of the binary image area in the normal state is set as a threshold value with respect to a determination value of 2,000,000. Then, in the case where the target object is determined as "OK", which is good, the storage priority thereof is set to the lowest value 0 in the case where the calculation result of the binary image area is equal to or greater than the threshold value and is set to 50 in the case where the calculation result of the binary image area is smaller than the threshold value. To be noted, in the case where the binary image area is below 2,000,000, that is, where the determination is "NG", which is not good, the storage priority is set to the highest value 100. The storage priority thus determined is imparted to the image data, or storage priorities of pieces of image data obtained in the past are updated. As a result of this, pieces of image data obtained in a state in which the possibility of occurrence of "NG" has increased can be stored with a high priority as compared with in the normal state in addition to pieces of image data whose inspection results are "NG".

In the storage priority imparting step S105, after the image data is output to the data storage 111, the storage priorities of the output image data and image data obtained in a specific period in the past, for example, the recent two weeks are changed to the storage priorities determined as described above. The data of image capturing date/time can be specified from image capturing information stored in the header of the image data or associated with the image data. At this time, the storage priority is not changed in the case where the original storage priority of the image data is higher than the value to which the storage priority is to be changed. That is, the higher value of storage priority before and after the change is used. To be noted, in the present exemplary embodiment, storage priorities are imparted to all pieces of image data obtained in the period. However, the storage priorities may be imparted or updated at specific intervals, for example, the storage priorities may be imparted to every 10 pieces of image data. In addition, in the case of imparting or updating the storage priorities at specific intervals, the intervals may be a constant value or a dynamic value that changes. In addition, the storage priorities of pieces of image data obtained in a certain period after the image feature value surpasses the determination threshold value may be increased, and, in the case where image data after the occurrence of this event is not necessary, the storage priority may be imparted to only pieces of image data obtained before the occurrence. In addition to imparting the storage priority to the image data, date/time of imparting of the storage priority or an application condition in which the storage priority has been imparted may be stored as log information. In addition, history information of update of the storage priority in the past may be stored as log information. For example, the history information includes date, time, storage priority, an application condition in which the storage priority has been changed, and so forth. Such log information can be stored in, for example, the data storage 111.

As described above, according to the present exemplary embodiment, storage priorities of pieces of image data obtained by the same image capturing apparatus in the past are updated to higher values with a feature value of image data obtained by image capturing by a specific image capturing apparatus exceeding a threshold value indicating deviation from a normal range as a trigger. Therefore, it becomes possible to keep not only pieces of image data in which "NG" has occurred but also pieces of image data that indicates possibility of occurrence of "NG". That is, pieces of image data obtained in a certain period before and after "NG" or a sign of "NG" occurs can be kept in the data storage 111. Therefore, image data necessary for analyzing the cause of production deficiency or measurement abnormality can be stored for a long period without deleting the image data even in the case where the capacity of the data storage 111 is limited.

Third Exemplary Embodiment

In the third exemplary embodiment, the storage priority is updated with a variance value of image feature values of the image data for determining the inspection result as a trigger. That is, in a stage before production deficiency or measurement abnormality occurs, control is performed such that pieces of image data obtained around a time at which the risk of occurrence of production deficiency or measurement abnormality has increased can be preferentially stored with the increase as a trigger.

First, a specific case where the variance value of the feature value of the image data for determining the inspection result increases will be described. Here, as presence/absence inspection of the part, an image of a black tray carrying a white part serving as a workpiece is captured by the image capturing portion 102, processing of extracting an outline thereof is performed, and then template matching processing is performed by comparing the outline with template data. An inspection step of making determination of "OK" in the case where a matching score serving as an image feature value of the image data whose minimum value is 0 and whose maximum value is 1.0 exceeds 0.8 and making determination of "NG" in the case where the matching score is smaller than 0.8 is employed as an inspection scheme of the image processing portion 104.

It is assumed that, in this image inspection, the matching score of images determined as "OK" is steady with an average value of 0.90 and a variance value of 0.04 at the initial stage after the inspection environment is established. Here, the standard deviation of the variance value is σ=0.01.

In addition, it is assumed that the matching score of images determined as "NG" is steady with an average value of 0.10 and a variance value of 0.04. Here, the standard deviation of the variance value is σ=0.01. However, in the case where the variance of the matching score of "OK" determination has increased to about 0.10, for example, as a result of an impact is applied to the image capturing portion 102 at a certain timing and the focus is displaced, the matching score becomes more likely to vary, and thus the possibility of making "NG" determination that is supposed to be "OK" determination increases.

In the presence/absence inspection of the part described above, similar erroneous determination can occur also in the case where, for example, the size of the part slightly changes due to difference in a production lot of the part, difference in cavity of a mold, or short-term or long-term change of the mold and thus the camera is not focused on the part portion.

In the form of inspection described above, for example, there is a possibility that storage priorities of pieces of image data obtained around the time of change in the feature value of the image data, for example, the variance of change of the binary image area, can be updated to higher values with the change as a trigger, and the pieces of image data can be stored preferentially. As a result of this, the fact that change has occurred in the state of the image capturing portion 102, the state of the tray, the state of the part, or the outer environment can be noticed at the time of referring to this image data and performing analysis and inspection afterwards. Then, measure can be taken by, for example, optimizing the image capturing portion 102, the tray, the part, or the outer environment, changing the threshold value for determination, or changing the image processing algorithm. To be noted, although presence/absence inspection by making determination on the basis of a matching score of template matching has been described as an example above, using change in the variance of another known image feature value related to the image data as a trigger can be also considered.

As described above, also in the third exemplary embodiment, the hardware configuration constituted by the image capturing apparatuses 101, the controller 110, and the data storage 111 is similar to the hardware configuration shown in FIGS. 1, 2, 9, and 10. In addition, the image capturing portion 102, the image processing portion 104, the image output portion 107, and the image deletion portion 109 constituting the image capturing apparatus 101 are similar to the first exemplary embodiment, and therefore descriptions thereof are omitted. The description below will be focused on the storage priority imparting portion 108 of the image capturing apparatus 101, particularly on step S104c of FIG. 5. In addition, although the control procedure of the third exemplary embodiment is shown in FIG. 5, the image capturing step S101, the image output step S103, the image deletion step S106, and so forth are similar to the first exemplary embodiment, and thus redundant description will be omitted.

Figure 5:
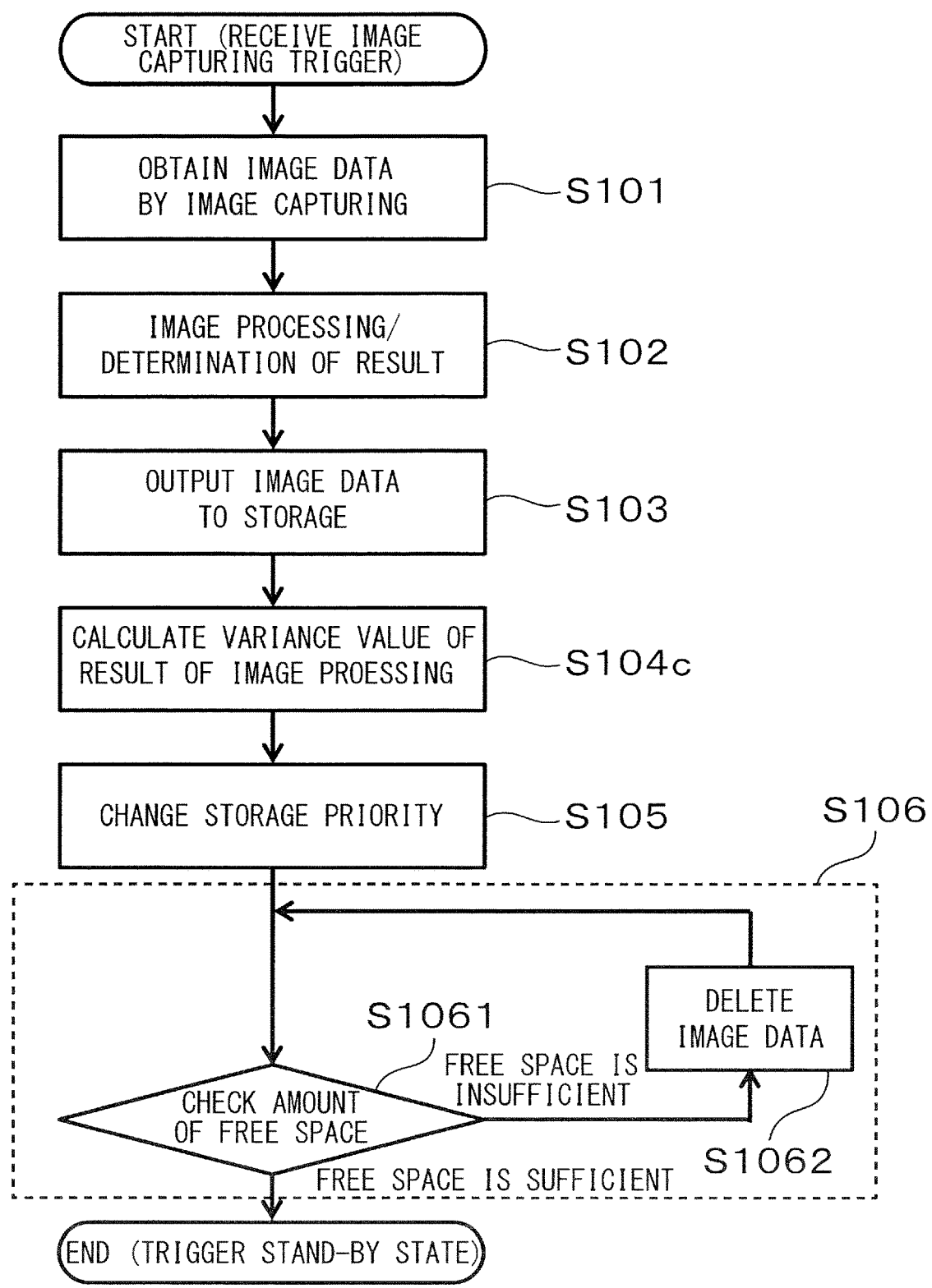
FIG. 5 is a flowchart illustrating another different control procedure of image data management according to the exemplary embodiments of the present invention.

In step S102 of FIG. 5, the image processing portion 104 of the third exemplary embodiment calculates, for the presence/absence inspection of the part, a matching score of the template matching described above as a feature value of the image data necessary for specifying the cause of production deficiency or measurement abnormality. In the third exemplary embodiment, description will be given on the premise that a matching score of template matching is calculated for obtaining the feature value of the image data. However, the matching score may be calculated by using various known filter processing, or the matching score serving as a feature value may be calculated by using other known image processing methods.

Processing performed by the storage priority imparting portion 108 of the third exemplary embodiment corresponds to, for example, a storage priority calculation step S104c and the storage priority imparting step S105 of FIG. 5. In the storage priority calculation step S104c, among the image data in the data storage 111, storage priorities of pieces of image data obtained in the past whose variance values of matching scores calculated by the image processing portion 104 are equal to or greater than a predetermined value are updated to higher values. At this time, storage priorities of pieces of image data obtained by the same image capturing portion 102 in the past at a preset period from now, for example, two weeks from now are updated to higher values continuously or at preset sampling intervals.

In the storage priority imparting step S105, the storage priority of the image data stored in the data storage 111 is updated on the basis of the storage priority determined in the storage priority calculation step S104c. At this time, also in the present exemplary embodiment, the specific period in the past to go back for updating the storage priority is set to two weeks, and storage priorities of pieces of image data obtained by the same image capturing portion 102 in this period are continuously updated to higher values. In addition, also in the present exemplary embodiment, the range of the storage priority is set to 0 to 100, 0 corresponds to the lowest storage priority, and 100 corresponds to the highest priority.

Here, a specific way of determining the storage priority in the storage priority imparting portion 108 of the third exemplary embodiment will be described. For example, it is assumed that the variance of the matching score serving as an image feature value for making "OK" determination of the object that is a target of inspection or measurement in a normal state has an average value of 0.04 and a standard deviation of σ=0.01. In such an inspection scheme, results of 99.7% of "OK" determination are supposed to be at most equal to or smaller than a value larger than the average value in the normal state by 3σ, which is 3× standard deviation. Therefore, the storage priority of a piece of image data is updated to a higher value with the variance of the matching score thereof being larger than the average value in the normal state by a difference greater than 3σ as a trigger, that is, with the variance of the matching score thereof being unexpectedly large as a trigger. To be noted, the threshold value of the variance value of the matching score serving as a feature value is not limited to 3σ, and 1σ, 2σ, 4σ, or 5σ may be used as the threshold value in accordance with the accuracy of determination of the system or the capacity of the storage. In addition, control may be performed such that the storage priority of a piece of image data determined as "OK" is updated to a higher value in the case where the variance value of the matching score is smaller than the average value by 3σ or more, in which the variance value is too small. In addition, the storage priority of a piece of image data determined as "NG" may be increased in the case where the variance value of the matching score thereof is larger or smaller than the average value in the normal state by a difference larger than 3σ. For example, in the third exemplary embodiment, a value of 0.07 obtained by adding 3σ=0.03 to the variance value of 0.04 in the normal state of the matching score is used as a threshold value of "OK" determination. Then, the storage priority is set to the minimum value of 0 in the case where the result of calculation of the variance value of the matching score serving as a feature value of 20 pieces of image data is equal to or smaller than the threshold value, and the storage priority is set to 50 in the case where the result of calculation of the variance value of the matching score serving as a feature value is larger than the threshold value.

In the storage priority imparting step S105, after the image data is output to the data storage 111, the storage priorities of the output image data and image data obtained in a specific period in the past, for example, the recent two weeks are changed to the storage priorities of higher values determined as described above. At this time, it goes without saying that the storage priorities of pieces of image data obtained by the same image capturing apparatus 101 are changed to the storage priorities of higher values determined as described above. In addition, at this time, the storage priority is not changed in the case where the original storage priority of the image data is higher than the value to which the storage priority is to be changed. That is, the higher value of storage priority before and after the change is used. This point is also similar to the second exemplary embodiment. In addition, instead of imparting storage priorities to all pieces of image data obtained in the specific period in the past, the storage priorities may be imparted at specific intervals, for example, the storage priorities may be imparted to every 10 pieces of image data. In addition, in the case of imparting the storage priorities at specific intervals, the intervals may be a constant value or a dynamic value that changes in accordance with the situation. In addition, the storage priorities of pieces of image data obtained in a certain period after the variance value of the image feature value surpasses a threshold value may be increased, and, in the case where image data after the occurrence of this event is not necessary, the storage priority may be imparted to only pieces of image data obtained before the occurrence. These points are also similar to the second exemplary embodiment. In addition to imparting the storage priority to the image data, date/time of imparting of the storage priority or an application condition in which the storage priority has been imparted may be stored as log information. In addition, history information of change of the storage priority in the past may be stored as log information. For example, the history information includes date, time, storage priority, an application condition in which the storage priority has been changed, and so forth. Such log information can be stored in, for example, the data storage 111.

As described above, according to the present exemplary embodiment, storage priorities of pieces of image data obtained by a specific image capturing portion in the past are updated to higher values on the basis of comparison between a variance value and threshold value of the feature value of the image data obtained by the same image capturing portion. Therefore, it becomes possible to keep not only pieces of image data in which "NG" has occurred but also pieces of image data that indicates possibility of occurrence of "NG". That is, pieces of image data obtained in a certain period before and after "NG" or a sign of "NG" occurs can be kept in the data storage 111. Therefore, image data necessary for analyzing the cause of production deficiency or measurement abnormality can be stored for a long period without deleting the image data even in the case where the capacity of the data storage 111 is limited.

Fourth Exemplary Embodiment

In the fourth exemplary embodiment, the storage priority is updated with change in a variation ratio, for example, change in the gradient of image feature value for determining the inspection result of as a trigger. That is, in a stage before production deficiency or measurement abnormality occurs, control is performed such that pieces of image data obtained around a time at which the risk of occurrence of production deficiency or measurement abnormality has increased can be preferentially stored with the increase as a trigger.

First, a specific case where the variation ratio of the image feature value of the image data for determining the inspection result increases will be described. For example, a binary image is obtained by capturing, by the image capturing portion 102, an image of a black tray carrying a white part illuminated by an LED light source that is not illustrated. Then, an inspection step of making determination of "OK" in the case where the area of a white portion corresponding to the part in the binary image exceeds 2,000,000 and determination of "NG" in the case where the area of the white portion corresponding to the part in the binary image is equal to or smaller than 2,000,000 is performed as the presence/absence inspection of the part serving as a workpiece that is a target of inspection or measurement.

It is assumed that, in this image inspection, at the initial stage after establishing the inspection environment, the binary image area of an image determined as "OK" is steady at a value of 3,000,000±500,000 and the binary image area of an image determined as "NG" is steady at a value of 1,000,000±500,000. Meanwhile, the brightness of the LED light decreases as the time passes, and the gradient of the decrease in brightness is, for example, almost constant at −10%/8,760 hours. According to this, the binary image area of the same object decreases about 300,000 each year. Therefore, it is assumed that the LED light is replaced by a new LED light every three years such that the binary image area does not become smaller than the determination threshold value of 2,000,000. However, in the case where the gradient of decrease in the brightness has decreased to −20%/10,000 hours at a certain timing, for example, as a result of an operator changing a brightness setting, there is a possibility that the binary image area decreases to about 1,200,000 in two years. As a result of this, there is a possibility that image data including the part in the field of view and supposed to be determined as "OK" is determined as "NG" before the LED light is replaced.

In the form of inspection described above, for example, there is a possibility that storage priorities of pieces of image data obtained around the time of change in the image feature value of the image data, for example, the gradient, in other words, variation ratio of change of the binary image area, can be updated to higher values with the change as a trigger, and the pieces of image data can be stored preferentially. As a result of this, the fact that change has occurred in the state of the image capturing portion 102, the state of the tray, the state of the part, or the outer environment can be noticed at the time of referring to this image data and performing analysis and inspection afterwards. Then, measure can be taken by, for example, optimizing the image capturing portion 102, the tray, the part, or the outer environment, changing the determination value, or changing the image processing algorithm. To be noted, although presence/absence inspection by making determination on the basis of binary image area has been described as an example above, using change in the gradient of change of another known image feature value related to the image data as a trigger can be also considered.

Also in the fourth exemplary embodiment, the hardware configuration constituted by the image capturing apparatuses 101, the controller 110, and the data storage 111 is similar to the hardware configuration shown in FIGS. 1, 2, 9, and 10. In addition, the image capturing portion 102, the image processing portion 104, the image output portion 107, and the image deletion portion 109 constituting the image capturing apparatus 101 are similar to the first exemplary embodiment, and therefore descriptions thereof are omitted. The description below will be focused on the storage priority imparting portion 108 of the image capturing apparatus 101, particularly on step S104d of FIG. 6. In addition, although the control procedure of the fourth exemplary embodiment is shown in FIG. 6, the image capturing step S101, the image output step S103, the image deletion step S106, and so forth are similar to the first exemplary embodiment, and thus redundant description will be omitted.

Figure 6:
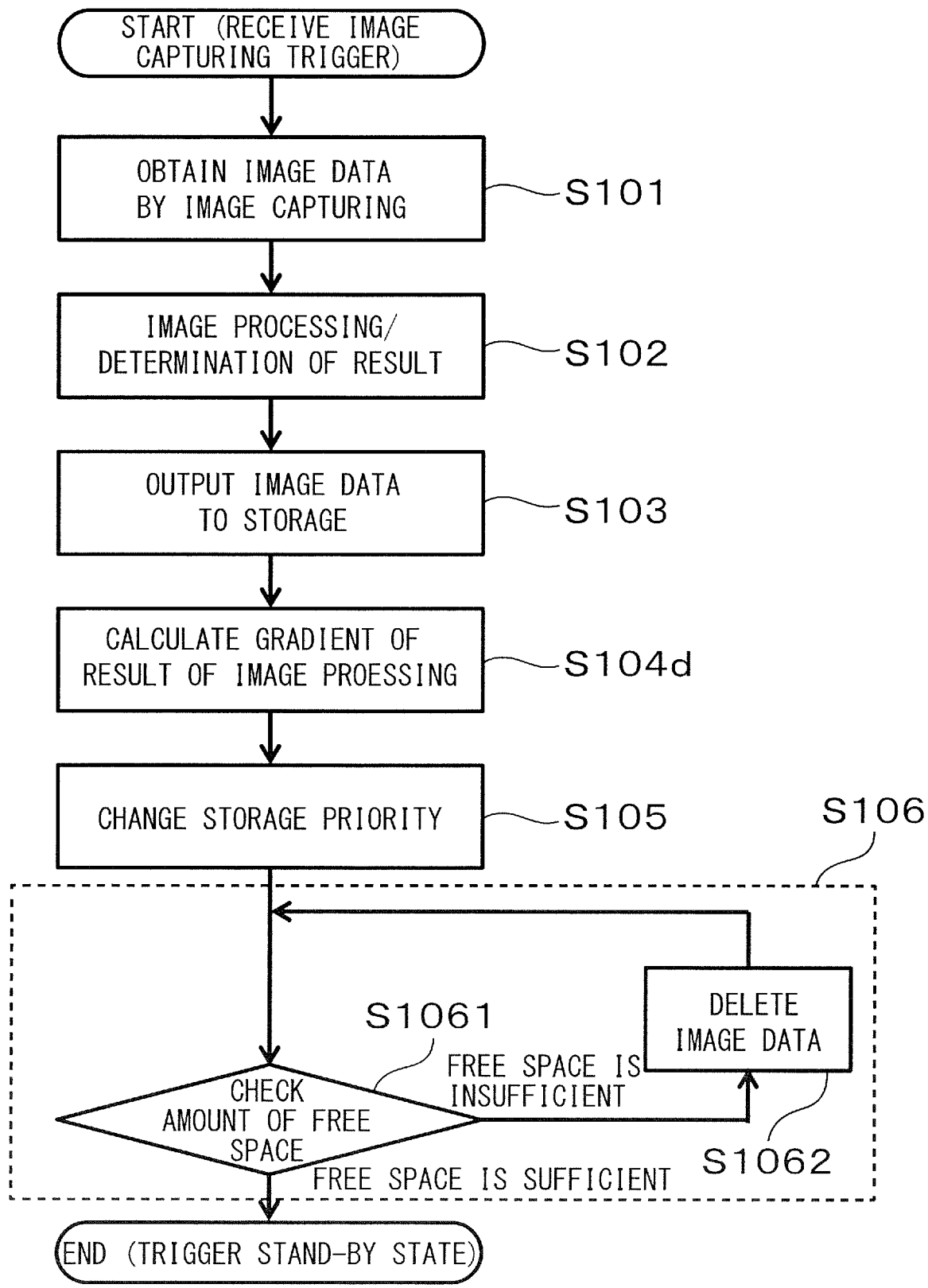
FIG. 6 is a flowchart illustrating another different control procedure of image data management according to the exemplary embodiments of the present invention.

In step S102 of FIG. 6, the image processing portion 104 of the fourth exemplary embodiment calculates, for the presence/absence inspection of the part, a binary image area for presence/absence inspection of the part as a feature value of the image data necessary for specifying the cause of production deficiency or measurement abnormality. To be noted, in the fourth exemplary embodiment, description will be given on the premise that a binary image area is calculated for obtaining the image feature value of the image data. However, for the presence/absence inspection of the part, various known filter processing can be used, or another image feature value may be calculated by using other known image processing methods and the gradient thereof can be evaluated.

Processing performed by the storage priority imparting portion 108 of the fourth exemplary embodiment corresponds to, for example, a storage priority calculation step S104d and the storage priority imparting step S105 of FIG. 6. In the storage priority calculation step S104d, among the image data in the data storage 111, storage priorities of pieces of image data obtained in the past whose gradient of the image feature value calculated by the image processing portion 104 is out of a set range are updated to higher values. At this time, storage priorities of pieces of image data obtained by the same image capturing portion 102 in the past at a preset period from now, for example, two weeks from now are updated to higher values continuously or at preset sampling intervals.

In the storage priority imparting step S105, the storage priority of the image data stored in the data storage 111 is updated on the basis of the storage priority determined in the storage priority calculation step S104d. At this time, also in the present exemplary embodiment, the specific period in the past to go back for updating the storage priority is set to two weeks, and storage priorities of pieces of image data obtained by the same image capturing portion 102 in this period are continuously updated to higher values. The set period and imparting intervals for the storage priority may be switched in accordance with a degree of gradient. In addition, also in the present exemplary embodiment, the range of the storage priority is set to 0 to 100, 0 corresponds to the lowest storage priority, and 100 corresponds to the highest priority.

Here, a specific way of determining the storage priority in the storage priority imparting portion 108 of the fourth exemplary embodiment will be described. For example, it is assumed that the gradient, in other words, variation ratio of the binary image area for making "OK" determination in the presence/absence inspection of the object has an average value of −100,000/8,760 hours and a standard deviation of $\sigma=10,000/8,760$ hours in a normal state. In this case, results of 99.7% of "OK" determination are supposed to be at least larger than a value smaller than the average value by $3\sigma$ in the normal state. Therefore, the storage priority of a piece of image data is updated to a higher value with the gradient being smaller than the average value in the normal state by a difference greater than 3σ as a trigger, that is, with the gradient of the binary image area being unexpectedly steep as a trigger. In addition, in the case where the gradient being larger than the average value in the normal state by a difference greater than 3σ is detected, the storage priority may not be updated to a higher value and thus the capacity of the data storage 111 can be saved because the binary image area has not decreased as much as expected. To be noted, the threshold value of the gradient of the binary image area serving as a feature value is not limited to 3σ, and 1σ, 2σ, 4σ, or 5σ may be used as the threshold value in accordance with the accuracy of determination of the system or the capacity of the storage. In addition, in the case where the possible range of the gradient of the binary image area is known, for example, in the case where specifications of brightness degradation, temperature characteristics, or specifications of other variations are described in a datasheet of the part or where accurate simulation is possible, a border of the range may be used as the threshold value.

In the fourth exemplary embodiment, a value of −130,000/8,760 hours obtained by subtracting 3σ=30,000/8,760 hours from the gradient of −100,000/8,760 hours of the binary image area in the normal state is used as a first threshold value. In addition, a value of −700,000/8,760 hours obtained by adding 3σ=30,000/8,760 hours to the gradient of −100,000/8,760 hours of the binary image area in the normal state is used as a second threshold value. In addition, in the case where, for example, a result of calculation on recent 20 images obtained in the past is equal to or smaller than the first threshold value, that is, −130,000/8,760 hours, storage priorities of pieces of image data obtained by the same image capturing portion 102 in the past are updated to 80. Also in this case, storage priorities of pieces of image data obtained by image capturing by the same image capturing portion 102 in a specific period in the past, for example, two weeks, are continuously updated.

In addition, in the case where the result of calculation is equal to or larger than the second threshold value, the storage priority is set to the minimum value 0. In the case where the result of calculation is between the first threshold value and the second threshold value, the storage priority is updated to 50 while setting the set period for the storage priority to three months in the past and the imparting interval of the storage priority to a day. In this manner, images are stored with intervals therebetween for checking long-term change in the case where the gradient of the feature value is moderate, and settings can be switched such that images are stored continuously for checking short-term change in the case where the gradient is steep.

In the storage priority imparting step S105, after the image data is output to the data storage 111, the storage priorities of the output image data and image data obtained in a recent specific period in the past, for example, the recent two weeks are changed to the storage priorities of higher values determined as described above. At this time, it goes without saying that the storage priorities of pieces of image data obtained by the same image capturing portion 102 are changed to the storage priorities of higher values determined as described above. In addition, at this time, the storage priority is not changed in the case where the original storage priority of the image data is higher than the value to which the storage priority is to be changed. That is, the higher value of storage priority before and after the change is used. This point is also similar to the second and third exemplary embodiments. In addition, the storage priorities of pieces of image data obtained in a specific period after change in the gradient of the image feature value may be increased every certain period. In the case where image data after the occurrence of the change in the gradient is not necessary, the storage priority may be imparted to or updated for only pieces of image data obtained before the occurrence of the change in the gradient. In addition to imparting the storage priority to the image data, date/time of imparting of the storage priority or an application condition in which the storage priority has been imparted may be stored as log information. In addition, history information of change of the storage priority in the past may be stored as log information. For example, the history information includes date, time, storage priority, an application condition in which the storage priority has been changed, and so forth. Such log information can be stored in, for example, the data storage 111.

To be noted, although a margin from the threshold value, increase in the variance value, and change in the gradient are checked for one image feature value image data in the description of the fourth exemplary embodiment, the check may be performed for a plurality of different image feature values and the storage priority may be imparted in a complex manner.

As described above, according to the present exemplary embodiment, storage priorities of pieces of image data obtained by a specific image capturing portion in the past are updated to higher values on the basis of change in the gradient of a feature value of the image data obtained by the same image capturing portion. Therefore, it becomes possible to keep not only pieces of image data in which "NG" has occurred but also pieces of image data that indicates possibility of occurrence of "NG". That is, pieces of image data obtained in a certain period before and after "NG" or a sign of "NG" occurs can be kept in the data storage 111. Therefore, image data necessary for analyzing the cause of production deficiency or measurement abnormality can be stored for a long period without deleting the image data even in the case where the capacity of the data storage 111 is limited.

Fifth Exemplary Embodiment

In the first to fourth exemplary embodiments, for example, as illustrated in FIGS. 1 and 2, a configuration in which a control apparatus of each image capturing apparatus 101 determines the storage priority of image data obtained by the image capturing portion 102 of the image capturing apparatus 101 and the storage priority in the past is updated has been shown. However, the subject of control of determining the storage priority of image data obtained by a specific image capturing portion and updating the storage priority in the past does not have to be the control apparatus of the image capturing apparatus 101. For example, a configuration in which the control of determining the storage priority and updating the storage priority in the past is performed by the controller 110 can be employed.

Figure 7:
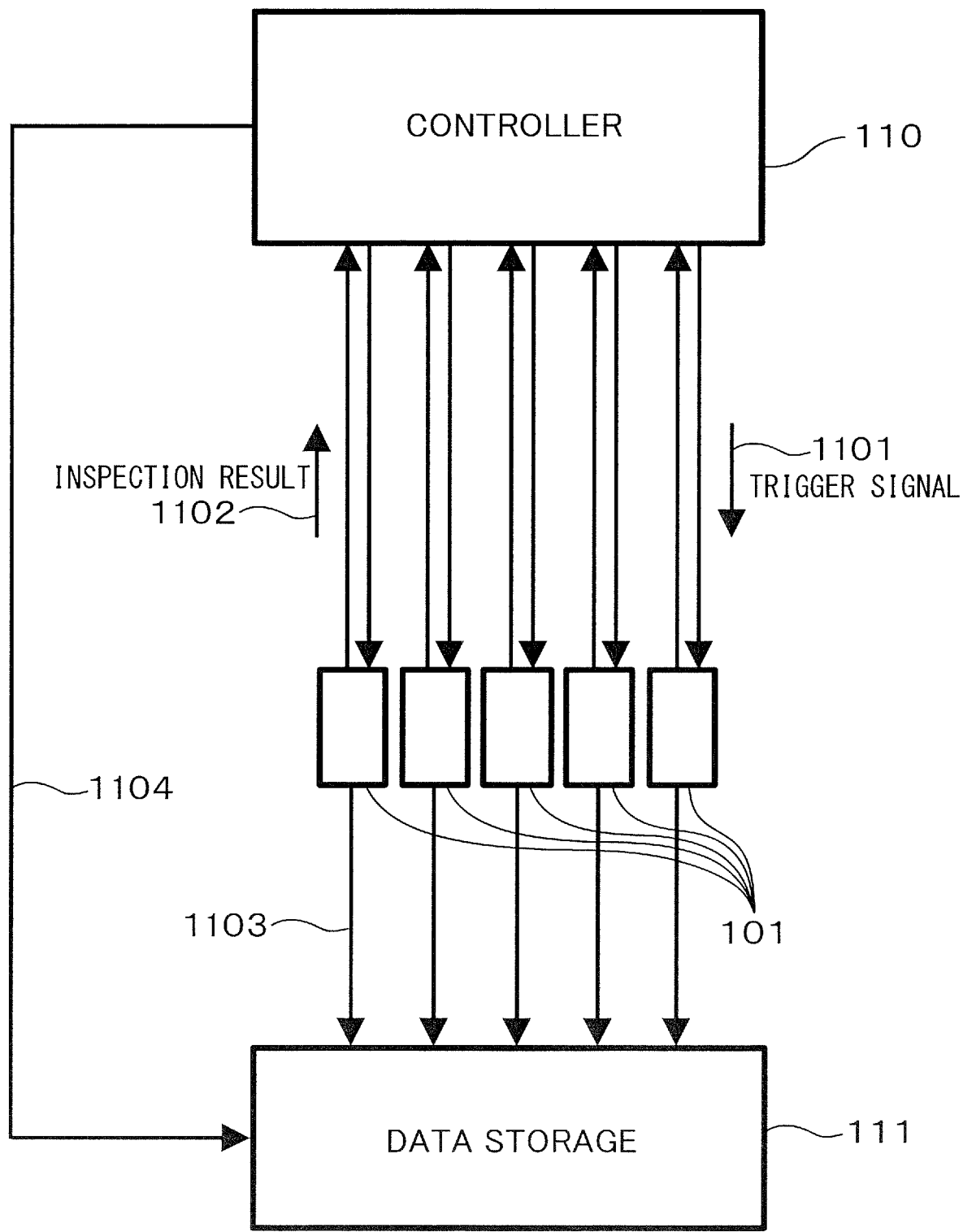
FIG. 7 is a block diagram illustrating a different configuration including the image capturing apparatus and the data storage according to the exemplary embodiments of the present invention.

FIG. 7 illustrates, in a similar manner to FIG. 2, a configuration in which the controller 110 performs the control of determining the storage priority and updating the storage priority in the past. The configuration of FIG. 7 is similar to FIG. 2 except that a path for a control signal 1104 is added between the controller 110 and the data storage 111. The control signal 1104 is used for the controller 110 to perform imparting or update of the storage priority on the data storage 111 or sending a request for deletion of the image data.

In the fifth exemplary embodiment, the hardware configuration constituted by the image capturing apparatuses 101, the controller 110, and the data storage 111 is similar to the hardware configuration shown in FIGS. 1, 2, 9, and 10. However, it suffices as long as the image capturing portion 102, the image processing portion 104, and the image output portion 107 are provided in the image capturing apparatus 101, and the storage priority imparting portion 108 and the image deletion portion 109 are not always necessary in the fifth exemplary embodiment.

Figure 8:
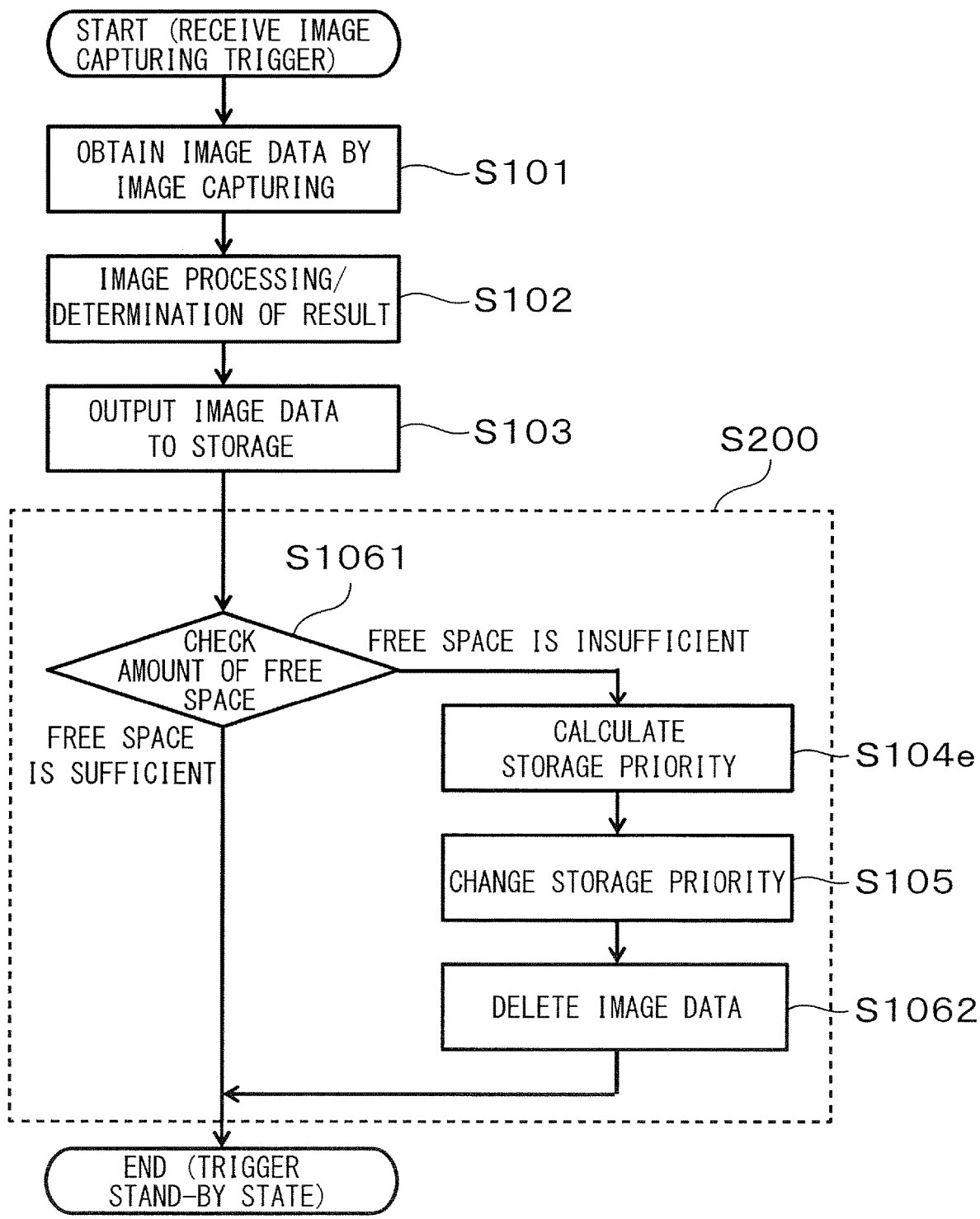
FIG. 8 is a flowchart illustrating a control procedure of image data management in the configuration of FIG. 7.

The control procedure of the fifth exemplary embodiment is shown in FIG. 8. In FIG. 8, the same processing steps as in FIGS. 3 to 6 are denoted by the same step numbers, and the contents of processing are the same as what has been described above. The image capturing step S101, the image processing/result determination step S102, and the image output step S103 of FIG. 8 are respectively performed by the image capturing portion 102, the image processing portion 104, and the image output portion 107 of the image capturing apparatus 101. Although details of these steps are similar to the first exemplary embodiment, for example, the data related to the state of the object that is a workpiece or a production apparatus used in the image processing/result determination step S102 is transmitted to the data storage 111 with corresponding image data. In this case, the data related to the object that is a workpiece or a production apparatus and obtained as a result of image processing is associated with image data obtained by the image capturing portion of the same image capturing apparatus, and stored in the data storage 111 or in the header of the image data.

In contrast, processing of step S200 including steps S1061, S104e, S105, and S1062 and indicated by a broken line is performed by the controller 110 of the fifth exemplary embodiment. As a result of this, calculation of the storage priority does not have to be performed in each image capturing apparatus 101, and thus there is a merit that the processing load on each image capturing apparatus is small.

In addition, in FIG. 8, the calculation of the storage priority in step S104e and the changing of the storage priority in step S105 performed by the controller 110 can be performed by any calculation method mentioned in the description of steps S104a to S104d and S105 of the first to fourth exemplary embodiments shown in FIGS. 3 to 6.

In addition, in the control of FIG. 8, the control apparatus of the controller 110 illustrated in FIG. 10 checks the amount of free space in the data storage 111 in step S1061 in a similar manner to the exemplary embodiments described above, and, in the case where the amount of free space is very small, the controller 110 performs steps S104e, S105, and S1062. That is, in the case where the amount of free space in the data storage 111 is very small, the controller 110 performs calculation of the storage priority in step S104e, changing of the storage priority in step S105, and deletion of the image data in step S1062. Therefore, there is a possibility that the processing load on the system as a whole becomes small.

To be noted, in the control of FIG. 8, control of referring to data indicating the state of the object stored in association with specific image data in the data storage 111 and imparting the storage priority or updating storage priority in the past is performed in the calculation and changing of the storage priority in steps S104e and S105. In addition, particularly in the case of updating the storage priority in the past, it goes without saying that pieces of image data obtained by the same image capturing portion 102 specified by the image capturing information of the image data or the like is a target thereof.

As described above, according to the present exemplary embodiment, the control of determining the storage priority of image data obtained by a specific image capturing portion, and updating storage priorities in the past, or further deleting the image data by using the storage priority can be performed by the controller 110. As a result of this, constituents of the image capturing apparatus 101 and a processing load on the image capturing apparatus 101 can be reduced. In addition, the processing load on the overall system can be greatly reduced by performing each processing of calculation of the storage priority in step S104e, changing of the storage priority in step S105, and deletion of image data in step S1062 in the case where the amount of free space in the data storage is very small.

In the exemplary embodiments described above, description has been given on the premise that the image data and the image capturing information that specifies the image capturing portion used for obtaining the image data are stored in the data storage 111 in association with each other in some way, or the image capturing information is stored in the header of the image data. However, for example, a configuration in which pieces of image data obtained by the same specific image capturing portion, data of storage priority thereof, image capturing information thereof, and the like are collectively stored in a specific directory or a folder in a file system of the data storage 111 may be employed. According to such a configuration, data in the same directory or folder can be selected as a target when updating storage priorities of pieces of image data obtained by the same image capturing portion or deleting image data. Therefore, according to such a configuration, there is a possibility that a processing load on the control apparatus required for data management can be reduced.

In addition, a configuration of evaluating the state of an object that is a workpiece or a production apparatus whose image has been captured by an image capturing portion by using an image feature value of the image data thereof has been mainly described above. However, the state of the object that is a workpiece or a production apparatus, for example, the presence or absence of the object, the state of movement of the object to a specific position, and an operation state such as an operation stroke can be detected by sensors such as the sensors 71, 72, 73 . . . illustrated in FIG. 9. As the sensors 71, 72, 73 . . . sensors that detects a value related to an environment in which the object is present such as optical sensors, vibration sensors, and temperature sensors can be used. In addition, control of updating the storage priority with deviation of the state of the object that is a workpiece or a production apparatus detected by the sensors 71, 72, 73 . . . from a normal range as a trigger may be performed. Alternatively, the storage priority determined on the basis of the evaluation of the feature value of the image data and the storage priority determined on the basis of the state of the object that is a workpiece or a production apparatus detected by the sensors 71, 72, 73 . . . may be further used in combination. For example, a configuration in which the final storage priority is obtained by adding or subtracting the storage priority determined on the basis of the evaluation of image feature value of the image data and the storage priority determined on the basis of the detection by the sensors 71, 72, 73 . . . may be considered.

The present invention can be also realized by processing performed by one or more processors in a computer of a system or an apparatus by reading and executing a program for realizing one or more functions of the exemplary embodiments described above provided to the system or the apparatus via a network or a recording medium. In addition, the present invention can be also realized by a circuit that realizes one or more functions, for example, an application specific integrated circuit: ASIC.

Although an example of a production system including a plurality of image capturing portions has been described in the first to fifth exemplary embodiments, the present invention can be of course also applied to a case where only one image capturing portion is provided. In addition, the application of the present invention is not limited to a production system, and the present invention can be also applied to a system that stores image data for a long period such as a surveillance camera. In the case of a surveillance camera, for example, image data may be stored such that, when a person or a car passing through a specific position is detected, storage priorities of pieces of image data obtained in a preset period and stored in the data storage are updated to higher values than in a normal state with the detection as a trigger.

It is preferable that a condition for calculating the storage priority and/or a condition for updating the storage priority can be set by a user. For example, the input apparatus 607 illustrated in FIG. 10 includes a display portion that displays information to a user, and the display portion is configured to display a setting/checking screen such that the user can input data. The setting/checking screen is preferably configured to be displayed at an arbitrary timing, for example, when the apparatus is booted or when the amount of free space in the data storage is very small, such that setting/checking can be performed.

The setting/checking screen on a display provided in the input apparatus 607 displays items to be input by the user. For example, "Update period of storage priority", "Update trigger of storage priority", and "Threshold vale of update trigger of storage priority" may be provided as input items.

"Update period of storage priority" may be selected by a user from a plurality of options, or may be arbitrarily set by the user. "Update trigger of storage priority" is preferably selected by the user from a plurality of options provided in advance, such as an inspection result used in the first exemplary embodiment, an image feature value used in the second exemplary embodiment, and a variance value of image feature value used in the third exemplary embodiment. A configuration in which the user can generate an arbitrary option is also preferable. The update trigger of the storage priority is not limited to one kind, and it is preferable that a plurality of kinds can be set. In addition, it is preferable that "Threshold value of update trigger" can be arbitrarily set by the user with respect to a set update trigger or can be selected from options.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-144927, filed Jul. 26, 2017 and Japanese Patent Application No. 2018-107083, filed Jun. 4, 2018, which are hereby incorporated by reference herein in their entirety.

What is claimed is:

1. An image data management method comprising:
a step of storing, in a storage device, a plurality of image data each associated with corresponding image capturing information and a corresponding storage priority, wherein the plurality of image data is stored in a manner such that the higher the storage priority is, the more preferentially the image data is kept in the storage device,
wherein the image capturing information includes identification information to identify an image capturing portion by which each of the plurality of image data is acquired and further includes image capturing date/time information, wherein the identification information specifies that the plurality of image data includes a first plurality of image data acquired in a first period and a second plurality of image data acquired in a second period after the first period, wherein the first plurality of image data includes a first piece of the first plurality of image data acquired by a first image capturing portion and a second piece of the first plurality of image data acquired by a second image capturing portion other than the first image capturing portion, and wherein the second plurality of image data includes a third piece of the second plurality of image data acquired by the second image capturing portion in the second period and a fourth piece of the second plurality of image data acquired by the first image capturing portion in the second period;
a step of changing with reference to the image capturing information, in response to a detection of a specific state relating to information obtained from the first image capturing portion after the second period, a first storage priority associated with at least the first piece of the first plurality of image data which has already been stored in the storage device into a second storage priority higher than the first storage priority; and
a step of deleting with reference to the image capturing information and the storage priority, in a third period after the changing, at least the second piece of the first plurality of image data associated with a storage priority lower than the second storage priority, whereas at least the first piece of the first plurality of image data associated with the second storage priority and at least the third piece of the second plurality of image data associated with a storage priority lower than the second storage priority are kept in the storage device in the third period.

2. The image data management method according to claim 1, further comprising a step of, on a basis of output of a sensor configured to detect an object, determining whether the object is in the specific state.

3. The image data management method according to claim 1, further comprising a step of, on a basis of an image feature value calculated from image data of an object acquired by the first image capturing portion, determining whether the object is in the specific state.

4. The image data management method according to claim 3, wherein the object is determined as being in the specific state in a case where the image feature value is out of a predetermined range.

5. The image data management method according to claim 4, wherein the image feature value is a value extracted from the image data on a basis of a shape or area of the object.

6. The image data management method according to claim 4, wherein the case where the image feature value is out of the predetermined range is regarded as a case where a state of the object is not good, and the specific state includes a state in which the state of the object is not good.

7. The image data management method according to claim 3, wherein the specific state includes a state in which at least one of a variance and variation ratio of image feature values obtained from a plurality of images captured by the first image capturing portion is within a predetermined range.

8. The image data management method according to claim 1, wherein in the step of changing, storage priorities associated with the first piece of the first plurality of image data are changed, whereas storage priorities associated with the second piece of the first plurality of image data are not changed.

9. The image data management method according to claim 1, wherein in the step of changing, storage priorities associated with the fourth piece of the second plurality of image data are changed whereas storage priorities associated with the third piece of the second plurality of image data are not changed.

10. The image data management method according to claim 9, further comprising a step of deleting at least the third piece of the second plurality of image data associated with a storage priority lower than the second storage priority.

11. The image data management method according to claim 1, further comprising a step of calculating an image feature value of the plurality of image data by processing the plurality of image data.

12. The image data management method according to claim 1, wherein the step of deleting is performed on a basis of an amount of free space in the storage device being below a predetermined value.

13. The image data management method according to claim 1, further comprising:
a step of generating the first piece of the first plurality of image data by the first image capturing portion; and
a step of generating other image data by the first image capturing portion after the step of storing the first plurality of image data;
wherein the specific state is detected using the other image data.

14. The image data management method according to claim 13, further comprising a step of calculating an image feature value of the other image data by processing the other image data, wherein the specific state is detected on a basis of the image feature value.

15. The image data management method according to claim 1, wherein the first piece of the first plurality of image data corresponds to a first inspection result and the second piece of the first plurality of image data corresponds to a second inspection result, and wherein the first and second inspection results express whether an inspection target is present or absent in a captured image region.

16. The image data management method according to claim 1, further comprising a step of changing, in response to a detection of a specific state after the third period, the storage priority associated with a piece of the second plurality of image data which has already been stored in the storage device into the second storage priority.

17. The image data management method according to claim 1, wherein the plurality of image data includes a third plurality of image data acquired before the first period, wherein the third plurality of image data includes a fifth piece of the third plurality of image data acquired by the first image capturing portion and a sixth piece of the third plurality of image data acquired by the second image capturing portion other than the first image capturing portion, wherein in the third period, further comprising deleting the fifth piece of the third plurality of image data associated with a storage priority lower than the second storage priority.

18. The image data management method according to claim 1, wherein the detection of a specific state includes on a basis of an image feature value calculated from image data of an object acquired by the first image capturing portion, determining whether the object is in a state in which at least one of a variance and variation ratio of image feature values obtained from a plurality of images captured by the first image capturing portion is within a predetermined range.

19. A production apparatus comprising:
an image capturing apparatus configured to perform the image data management method according to claim 1; and
a production mechanism configured to handle a workpiece,
wherein the image capturing apparatus is configured to capture one or both of an image of the production mechanism and the workpiece handled by the production mechanism, and the image capturing apparatus includes the first image capturing portion and the second image capturing portion.

20. A production system comprising a plurality of production apparatuses according to claim 19.

21. An image data management method for a production system, the production system comprising a plurality of production apparatuses, the production apparatuses each comprising a control apparatus and an image capturing apparatus configured to perform the image data management method according to claim 1 and a production mechanism configured to handle a workpiece,
wherein the image capturing apparatus disposed in a specific production apparatus acquires an image of one or both of the production mechanism thereof and the workpiece handled by the production mechanism, and
wherein the control apparatus of the image capturing apparatus disposed in the specific production apparatus performs (i) an image capturing step, (ii) a step of adding the storage priority to the image data and storing the storage priority and the image data in the storage device in a manner such that the storage priority and the image data are associated with each other, and (iii) the step of changing the first storage priority into the second storage priority.

22. A non-transitory computer-readable recording medium storing a control program configured to cause a control apparatus to perform each step of the image data management method according to claim 1.

23. A production apparatus comprising:
- an image capturing apparatus configured to perform the image data management method according to claim 1;
- a production mechanism configured to handle a workpiece; and
- an input apparatus through which a user is capable of inputting data,
- wherein the input apparatus comprises a display portion, and a screen for setting or checking a condition for updating the storage priority is displayed in the display portion.

24. The production apparatus according to claim 23, wherein either one of a period in which the storage priority is updated and a condition for determining whether an object is in the specific state is capable of being input via the screen.

25. An image data management method comprising:
- a step of storing, in a storage device, a plurality of image data each associated with a corresponding storage priority, the plurality of image data being stored in a manner such that the higher the storage priority is, the more preferentially the image data is kept in the storage device, the plurality of image data including a first plurality of image data acquired in a first period and a second plurality of image data acquired in a second period after the first period, wherein the first plurality of image data includes a first piece of the first plurality of image data acquired by a first image capturing portion and a second piece of the first plurality of image data acquired by a second image capturing portion other than the first image capturing portion, and wherein the second plurality of image data includes a third piece of the second plurality of image data acquired by the second image capturing portion in the second period and a fourth piece of the second plurality of image data acquired by the first image capturing portion in the second period;
- a step of detecting a specific state relating to information obtained from the first image capturing portion after the second period, wherein the detecting includes on a basis of an image feature value calculated from image data of an object acquired by the first image capturing portion, determining whether the object is in a state in which at least one of a variance and variation ratio of image feature values obtained from a plurality of images captured by the first image capturing portion is within a predetermined range;
- a step of changing, in response to the detecting, a first storage priority associated with at least the first piece of the first plurality of image data which has already been stored in the storage device into a second storage priority higher than the first storage priority; and
- a step of deleting, in a third period after the changing, at least the second piece of the first plurality of image data associated with a storage priority lower than the second storage priority, whereas at least the first piece of the first plurality of image data associated with the second storage priority and at least the third piece of the second plurality of image data associated with a storage priority lower than the second storage priority are kept in the storage device in the third period.

* * * * *